United States Patent [19]
Katsumi

[11] Patent Number: 5,608,558
[45] Date of Patent: Mar. 4, 1997

[54] DEFECT DETECTION METHOD AND APPARATUS FOR ACTIVE MATRIX SUBSTRATE OR ACTIVE MATRIX LIQUID CRYSTAL PANEL AND DEFECT REPAIRING METHOD THEREOF

[75] Inventor: Irie Katsumi, Kashihara, Japan

[73] Assignee: Sharp Kabushiki Kaisha, Osaka, Japan

[21] Appl. No.: 424,727

[22] Filed: Apr. 18, 1995

[30] Foreign Application Priority Data

Apr. 26, 1994 [JP] Japan .................................. 6-088354

[51] Int. Cl.$^6$ ................................................ G02F 1/1343
[52] U.S. Cl. ................................................ 349/192; 324/770
[58] Field of Search ............................ 324/770; 359/59, 359/62

[56] References Cited

U.S. PATENT DOCUMENTS

| | | | |
|---|---|---|---|
| 5,175,504 | 12/1992 | Henley | 324/501 |
| 5,432,461 | 7/1995 | Henley | 324/770 |
| 5,459,410 | 10/1995 | Henley | 324/770 |

FOREIGN PATENT DOCUMENTS

| | | |
|---|---|---|
| 63-123093 | 5/1988 | Japan . |
| 2-064615 | 3/1990 | Japan . |

OTHER PUBLICATIONS

U.S. Appl. No. 08/158,843, filing date Nov. 24, 1993, Kondo et al., pending.

*Primary Examiner*—William L. Sikes
*Assistant Examiner*—James A. Dudek
*Attorney, Agent, or Firm*—David G. Conlin; Milton Oliver

[57] ABSTRACT

According to the present invention, a defect detection method for at least one of an active matrix substrate and an active matrix liquid crystal panel is provided. The active matrix substrate includes: an insulating substrate; a plurality of pixel electrodes arranged in a matrix fashion on the substrate; switching elements for driving the plurality of pixel electrodes; and scanning lines and signal lines which are respectively connected to the switching elements and are formed so as to be crossed with each other, while the active matrix liquid crystal panel includes: the active matrix substrate; a counter substrate provided with counter electrodes thereon and disposed so as to be opposed to the active matrix substrate; and a liquid crystal layer interposed between the active matrix substrate and the counter substrate. In accordance with the method of the invention, a voltage signal having a voltage level higher than that of a commonly used driving voltage is applied to a portion between the scanning lines and the signal lines of the active matrix substrate so as to detect the defects.

18 Claims, 21 Drawing Sheets

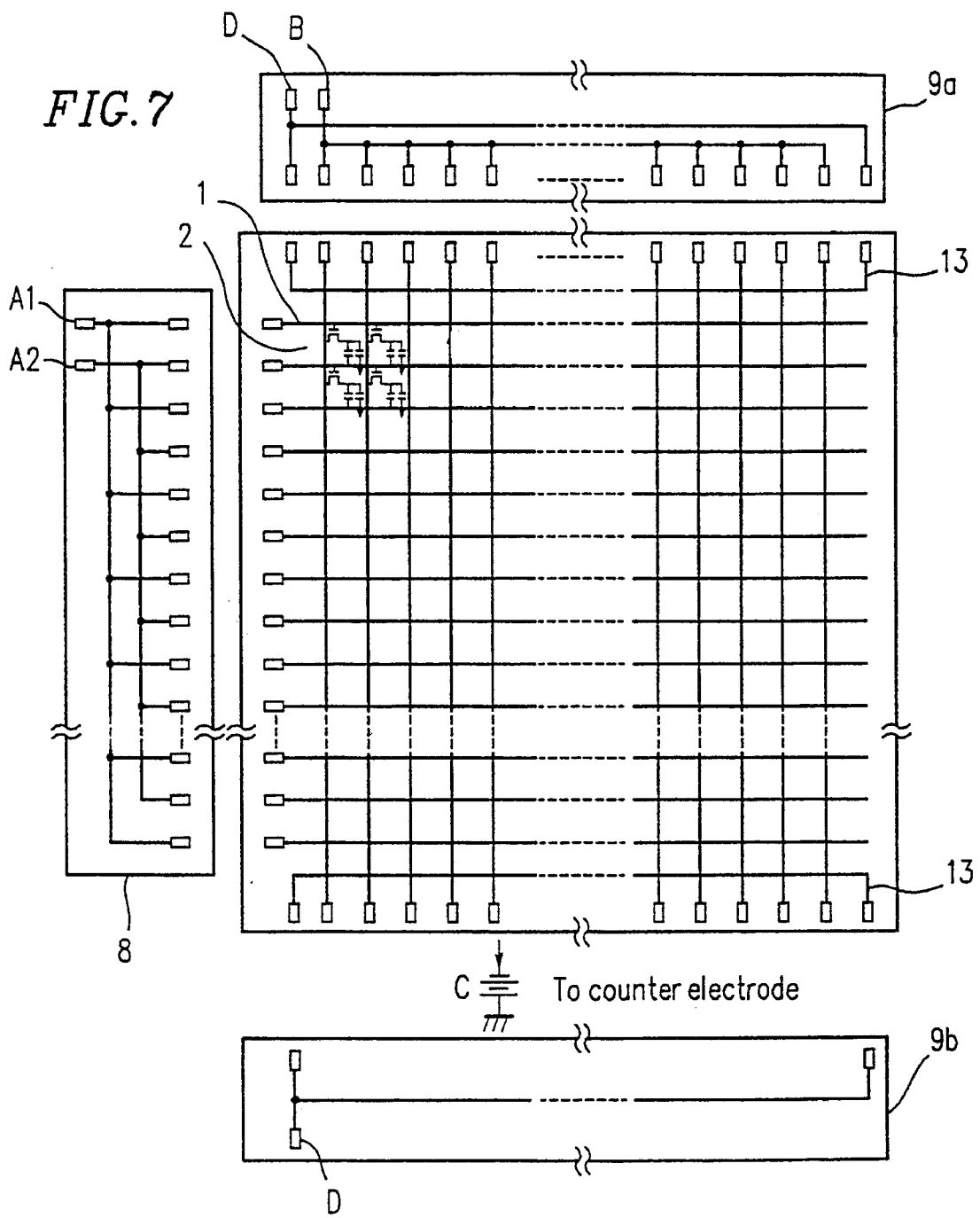

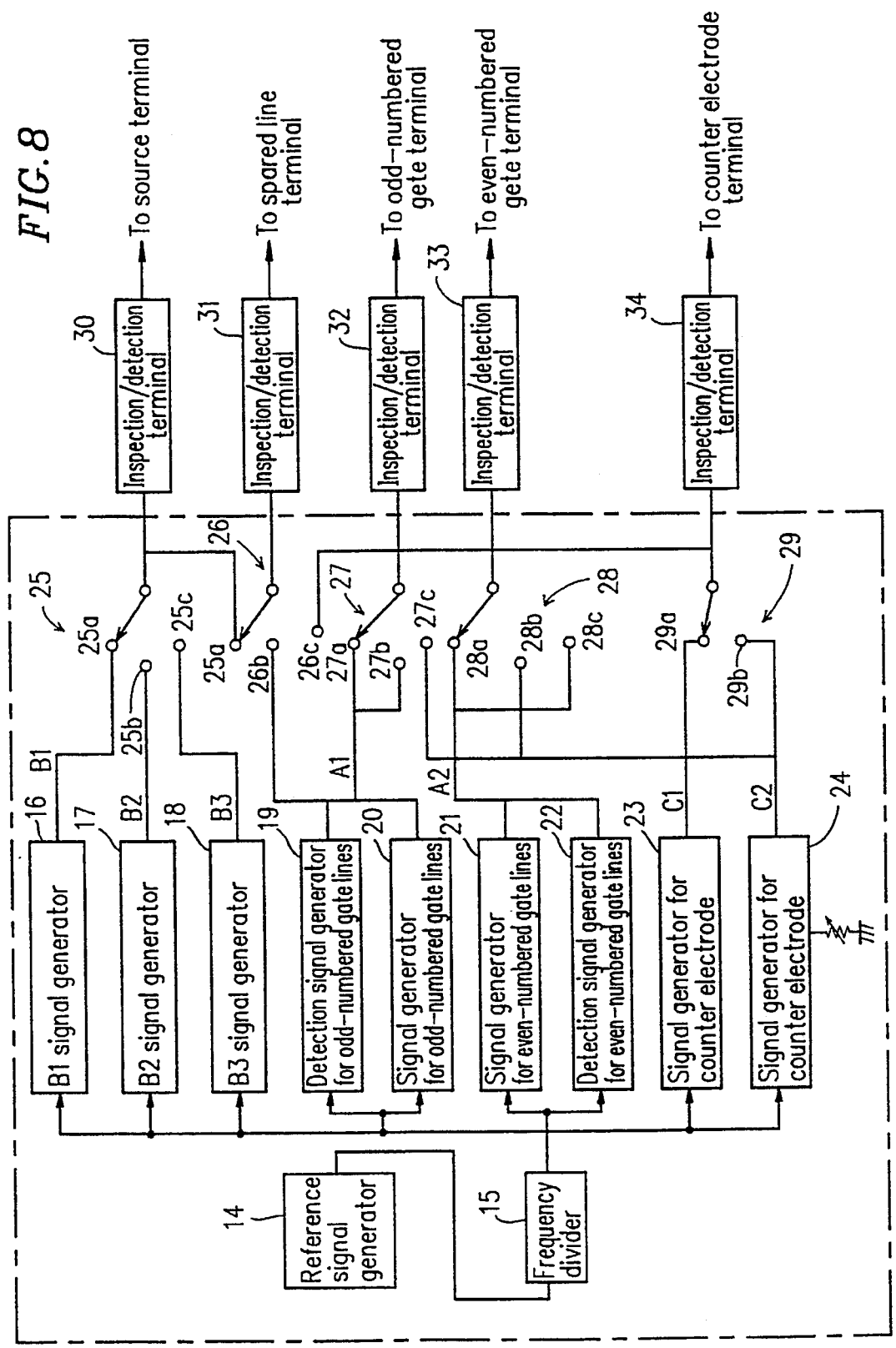

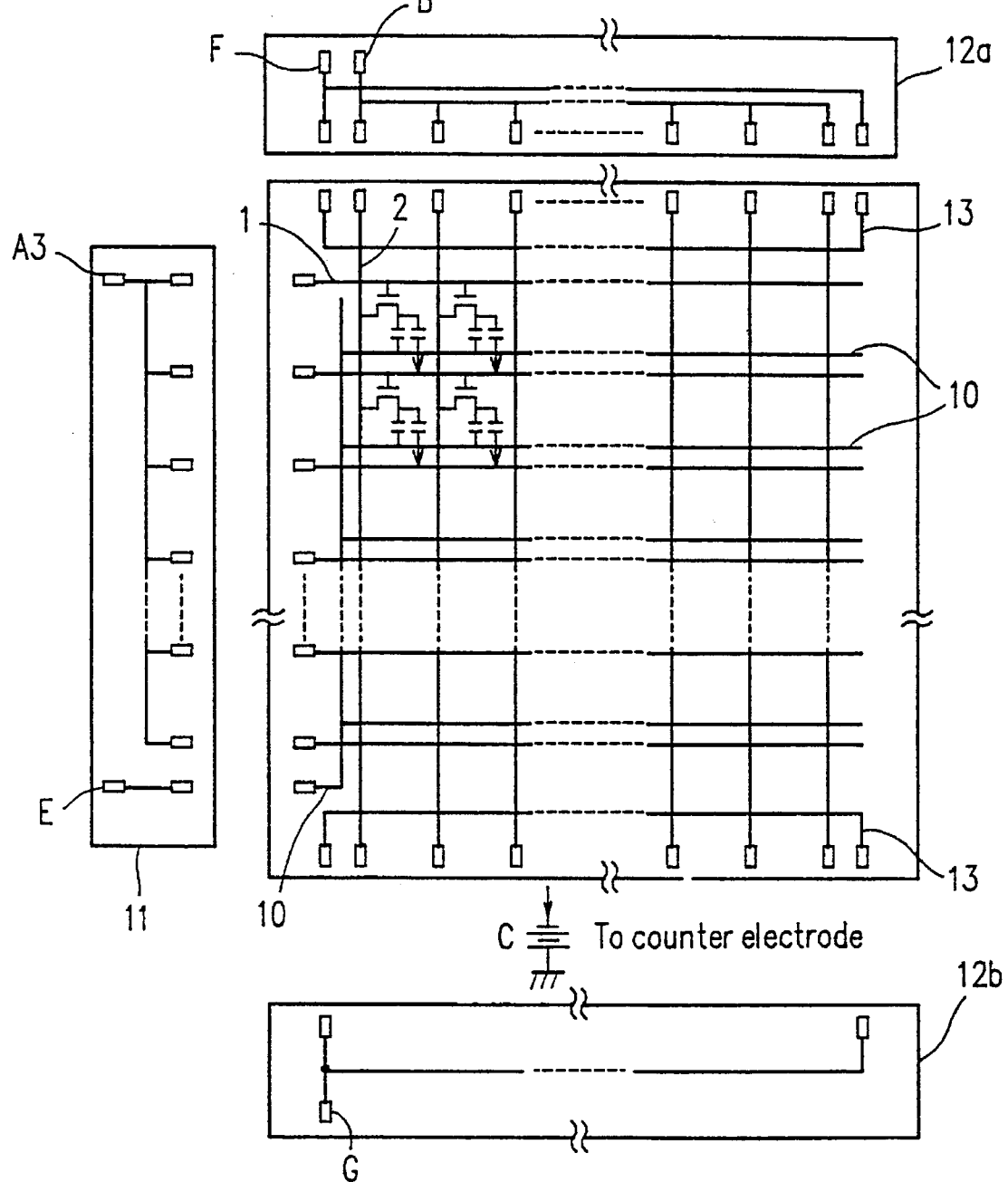

E (at normal state)

DEFECT DETECTION METHOD AND APPARATUS FOR ACTIVE MATRIX SUBSTRATE OR ACTIVE MATRIX LIQUID CRYSTAL PANEL AND DEFECT REPAIRING METHOD THEREOF

BACKGROUND OF THE INVENTION

1. Field of the Invention

The present invention relates to a method and an apparatus for detecting the defects of an active matrix substrate constituting a display apparatus in conjunction with a display medium such as liquid crystal and an active matrix display panel, and also relates to a method for repairing such defects as found therein.

2. Description of the Related Art

In an active matrix liquid crystal panel, pixel electrodes are arranged in a matrix fashion on an insulating substrate, and the respective pixel electrodes are independently driven by active elements (switching elements). Recently, in place of a CRT, the active matrix liquid crystal panel of this type has been practically used for various kinds of display apparatuses applicable for a liquid crystal television, a word processor, a computer, and the like. As a switching element for selectively driving each of the pixel electrodes, a thin film transistor (TFT), a metal-insulator-metal (MIM), an MOS transistor, a diode, a varistor, or the like is generally employed.

FIG. 1 is a schematic circuit diagram showing an active matrix display apparatus utilizing TFTs as the switching elements. FIG. 2 is a partially enlarged view showing the active matrix display apparatus shown in FIG. 1. This display apparatus includes: an active matrix substrate and a counter substrate which are disposed so as to be opposed to each other; and a liquid crystal layer interposed between the pair of substrates. On the active matrix substrate, a plurality of gate bus lines 1 functioning as scanning lines are provided in parallel and a plurality of source bus lines 2 functioning as signal lines are also provided in parallel so as to cross orthogonally with the gate bus lines 1. As shown in FIG. 2, in the vicinity of each of the crossings of the gate bus lines 1 and the source bus lines 2, a TFT 3 is disposed. The TFT 3 is connected to a pixel electrode 4 which is provided in a rectangular region defined by two adjacent gate bus lines 1 and two adjacent source bus lines 2. As shown in FIG. 1, spare lines 13 functioning as redundant lines of the source bus lines 2 are also provided so as to cross orthogonally with the source bus lines 2. Depending on the case, several or several tens of divided spare lines 13 are formed so as to correspond to each set of source bus lines 2. In the case where the spare lines 13 are employed in the examples of the invention to be described later, the lines 13 may be formed in the same manner.

As shown in FIG. 2, on a surface of the counter substrate which is opposed to the active matrix substrate and is in contact with the liquid crystal layer, counter electrodes 5 are formed. Between a pixel electrode 4 and a counter electrode 5 corresponding to the pixel electrode 4, a pixel capacitance ($C_{lc}$) 6 is formed. A storage capacitance ($C_s$) 7 is formed in parallel with the pixel capacitance ($C_{lc}$) 6. Namely, the storage capacitance ($C_s$) 7 is formed between the pixel electrode 4 and one of the two adjacent gate bus lines 1 interposing the pixel electrode 4. That is, the above-described active matrix substrate is constructed under a so-called Cs-on-Gate structure.

In a conventional active matrix liquid crystal display apparatus having the Cs-on-Gate structure, as shown in FIG. 3, a signal A1 is supplied to odd-numbered gate bus lines 1 and a signal A2 is supplied to even-numbered gate bus lines 1 in order to inspect the defects of the substrate. In addition, a signal B is supplied to the source bus lines 2 and a signal C is supplied to the counter electrodes 5. These signals A1 and A2 control the ON/OFF states by sequentially scanning gate electrodes of the TFTs 3. The signal B writes a signal voltage at a certain level corresponding to the image through a TFT 3 into each pixel, and maintains the voltage level until the next frame is written. The voltage of the signal C is variable between the ON voltage and the OFF voltage of the TFT 3 to be applied to the gate bus lines 1, i.e. the signal C makes the DC level variable. The signal D is supplied to the spare lines 13 on both sides.

FIG. 4 is a schematic circuit diagram showing an active matrix display apparatus including TFTs as switching elements and having a construction different from that of FIG. 1. FIG. 5 is a partially enlarged view of the active matrix display apparatus shown in FIG. 4. This display apparatus includes: an active matrix substrate and a counter substrate which are disposed so as to be opposed to each other; and a liquid crystal layer interposed between the pair of substrates. On the active matrix substrate, a plurality of gate bus lines 1 functioning as scanning lines are provided in parallel, and a plurality of source bus lines 2 functioning as signal lines are also provided in parallel so as to be orthogonally crossed with the gate bus lines 1. As shown in FIG. 5, in the vicinity of each of the crossings of the gate bus lines 1 and the source bus lines 2, a TFT 3 is disposed. The TFT 3 is connected to a pixel electrode 4 which is provided in a rectangular region defined by two adjacent gate bus lines 1 and two adjacent source bus lines 2. As shown in FIG. 4, spare lines 13 functioning as redundant lines of the source bus lines 2 are also provided so as to be orthogonally crossed with the source bus lines 2. In addition, a plurality of common lines 10 for storage capacitance are provided in parallel with the gate bus lines 1.

On a surface of the counter substrate which is opposed to the active matrix substrate and in contact with the liquid crystal layer, counter electrodes 5 are formed. Between a pixel electrode 4 and a counter electrode 5 corresponding to the pixel electrode 4, a pixel capacitance ($C_{lc}$) 6 is formed. A storage capacitance ($C_s$) 7 is formed in parallel with the pixel capacitance ($C_{lc}$) 6. Namely, the storage capacitance ($C_s$) 7 is formed between the pixel electrode 4 and a common line for storage capacitance 10. That is, the above-described active matrix substrate is constructed under a so-called Cs-on-Common structure.

In a conventional active matrix liquid crystal display apparatus under the Cs-on-Common structure, as shown in FIG. 6, a signal A3 is supplied to the gate bus lines 1 and a signal E is supplied to the common lines 10 in order to inspect the defects of the substrate. In addition, a signal B is supplied to the source bus lines 2, a signal F is supplied to the spare lines 13, and a signal C is supplied to the counter electrodes 5. The signal A3 controls the ON/OFF states by sequentially scanning gate electrodes of the TFTs 3. The signal B writes a signal voltage at a certain level corresponding to the image through a TFT 3 into each pixel, and maintains the voltage level until the next frame is written. The voltage of the signal C is variable between the ON voltage and the OFF voltage of a TFT 3 to be applied to the gate bus lines 1. A signal G is supplied to the spare lines 13 on both sides.

Generally, in both of the two exemplary active matrix substrates mentioned above, electrical insulation is maintained not only among the plurality of pixel electrodes 4 and among the plurality of TFTs 3, but also among the different kinds of bus lines, for example, among the gate bus lines 1 and the source bus lines 2, among the spare lines 13 and the source bus lines 2, and among the common lines 10 for storage capacitance and source bus lines 2. This substrate is provided with three-dimensional lines, and therefore a great number of crossings are formed between the crossing bus lines. An active matrix substrate is formed by a photolithography process or the like so that minute patterns may be formed thereon in the same manner as the production process for a semiconductor device. Accordingly, several kinds of defects such as an abnormal pattern are likely to occur because of dust and the like. Therefore, if a leakage current is generated at a crossing of bus lines owing to the presence of a pin-hole, etc., then the resulting display quality becomes inferior. In a display apparatus of this type, even a minor defect may be identified easily, and so such an apparatus is regarded as an inferior product. Therefore, it is very important to inspect the presence/absence of such defects, repair the defects, and eliminate such an inferior product for improving the production yield. In order to repair the defects, it is necessary to identify the positions of the defects and conduct an appropriate type of repair in accordance with the positions where the defects have occurred.

Japanese Laid-Open Patent Publication No. 63-123093 discloses a method for inspecting point defects of an active matrix liquid crystal panel, which are caused by a short-circuit between a gate electrode and a drain electrode and between a source electrode and a drain electrode of a TFT. The method includes a step of performing a display operation test. This patent publication describes that such an inspection method may be applied also in the case where a direct short circuit state is generated between a gate bus line and a pixel electrode or between a source bus line and a pixel electrode. This patent publication also describes that the short circuit generated between a gate electrode and a source electrode causes line defects where all the pixels connected to the gate bus lines and the source bus lines including the short-circuit portions can not operate any longer.

In the case where a leakage current is generated between a gate bus line 1 and a source bus line 2 because of a short circuit and the like, the display, conducted by the pixel electrodes arranged in a horizontal line and connected to the gate bus line 1 where the leakage current is generated and by the pixel electrodes arranged in a vertical line and connected to the source bus line 2 where the leakage current is generated, becomes inferior, so that line defects are displayed in a cross shape. Judging from the shape, the position where the leakage current is generated may be determined at the intersection of the cross, that is, the crossing of the gate bus line 1 and the source bus line 2 which are connected to the pixel electrode.

Japanese Laid-Open Patent Publication No. 2-64615 discloses a method for repairing the defects of an active matrix liquid crystal panel which are caused by the short circuit between a common line for a storage capacitance (in this case, an MOS capacitance) and a source bus line or between a common line and a gate bus line. For example, in the case where the MOS capacitance is of an N type, the difference in the display condition between the short-circuit source bus line and a normal source bus line may be recognized when a liquid crystal panel is operated. According to this patent publication, if the short-circuit source bus line is grounded, then the voltage level of the short-circuit common line alone is lowered to a ground level equal to or lower than the inverse threshold voltage. Therefore, the MOS capacitance formed by the common line becomes smaller than the original capacitance. As a result, the displayed portions along some horizontal line including the short-circuited common line become a little blacker than the other horizontal lines in a negative type gray-scale tone display condition where the pair of polarizing plates are disposed in parallel. Thus the short circuit portion may be determined at the crossing of the common line and a vertical line. Another repair method is described in this publication. In accordance with the method, both ends of the short-circuit portion of a source bus line or a common line for a storage capacitance are cut off with a laser beam, and then the floating signal line, both ends of which have been cut off, is connected through a peripheral bypass to external terminals.

A conventional active matrix liquid crystal panel, however, has a problem in that the generation of a leakage current at the crossing of a spare line 13 and a source bus line 2 may be recognized only after a driving circuit is mounted on the substrate. The reason for the generation of such a problem will be described below.

In the case where a source bus line 2 is disconnected, line defects occur in the floating portion of the disconnected source bus line 2. In this case, a spare line 13 is employed for repairing the line defects by connecting the crossing of the disconnected source bus line 2 and the spare line 13 with a laser beam and by supplying a signal to both ends of the source bus line 2. In order to confirm whether the repair is accomplished or not, the same signal as that supplied to the source bus line 2 is supplied to the spare line 13, and then it is inspected whether the source bus line 2 may be operated in the same way as the other normal source bus lines 2 or not. Accordingly, even if another leakage current is generated at any other crossing of the spare line 13 and the source bus line 2 other than the repaired portion for which the spare line 13 is provided, no variation occurs in the signal transmitted through the source bus line 2 where another leakage current is generated. Thus there is no change in the display quality, thereby making it impossible to recognize the leakage current.

Because of the above-mentioned problems, the generation of the leakage current between the spare line 13 and the source bus line 2 can be recognized only after a driving circuit is mounted on the substrate. So the leakage current is conventionally inspected during a mounting step for producing a module and therefore a defective apparatus can not be screened until then. Accordingly, such a problem causes a secondary problem of a decrease in the production yield during the mounting step for producing a module.

On the other hand, another problem occurs in that what is likely to become a defect in the future can not be identified. That is to say, if any insulated portion, the insulation properties of which have been degraded because of the existence of pin holes or some residual film, exists anywhere between the insulated electrodes, e.g. a crossing of bus lines, then the insulation properties may be further degraded owing to the stress caused during long-term use thereby generating some defective parts. According to a conventional inspection method, a driving voltage in a level commonly used for a display apparatus is employed. It is true that inferior portions already existing at the time of the inspection may be inspected, but the portions having degraded insulation properties which are likely to become defective parts because of stress after long-term use can not be inspected. Therefore, such an apparatus lacks in reliability.

SUMMARY OF THE INVENTION

According to one aspect of the invention, a method for detecting defects of at least one of an active matrix substrate and an active matrix liquid crystal panel is provided. The active matrix substrate includes: an insulating substrate; a plurality of pixel electrodes arranged in a matrix fashion on the substrate; switching elements for driving the plurality of pixel electrodes; and scanning lines and signal lines which are respectively connected to the switching elements and are formed so as to be crossed with each other. The active matrix liquid crystal panel includes: the active matrix substrate; a counter substrate provided with counter electrodes thereon and disposed so as to be opposed to the active matrix substrate; and a liquid crystal layer interposed between the active matrix substrate and the counter substrate. In the defect detection method of the invention, a voltage signal having a voltage level higher than that of a commonly used driving voltage is applied to a portion between the scanning lines and the signal lines of the active matrix substrate during a predetermined period of time so as to detect defects.

According to another aspect of the invention, an apparatus for detecting the defects of at least one of an active matrix substrate and an active matrix liquid crystal panel is provided. The active matrix substrate includes: an insulating substrate; a plurality of pixel electrodes arranged in a matrix fashion on the substrate; switching elements for driving the plurality of pixel electrodes; and scanning lines and signal lines which are respectively connected to the switching elements and are formed so as to be crossed with each other. The active matrix liquid crystal panel includes: the active matrix substrate; a counter substrate provided with counter electrodes thereon and disposed so as to be opposed to the active matrix substrate; and a liquid crystal layer interposed between the active matrix substrate and the counter substrate. The defect detection apparatus of the invention includes: connection terminals respectively connected to the scanning lines, the signal lines and the counter electrodes; a detection signal application means for applying a voltage signal having a voltage level higher than a driving voltage commonly used to a portion between the scanning lines and the signal lines during a predetermined time period; and a detection means for detecting the defects of the active matrix substrate via the connection terminals.

According to still another aspect of the invention, a method for repairing the defects of at least one of an active matrix substrate and an active matrix liquid crystal panel is provided. The active matrix substrate includes: an insulating substrate; a plurality of pixel electrodes arranged in a matrix fashion on the substrate; switching elements for driving the plurality of pixel electrodes; and scanning lines and signal lines which are respectively connected to the switching elements and are formed so as to be crossed with each other. The active matrix liquid crystal panel includes: the active matrix substrate; a counter substrate provided with counter electrodes thereon and disposed so as to be opposed to the active matrix substrate; and a liquid crystal layer interposed between the active matrix substrate and the counter substrate. The repairing method includes the steps of: detecting the defects by applying a voltage signal having a voltage level higher than a driving voltage commonly used to a portion between the scanning lines and the signal lines of the active matrix substrate during a predetermined period of time, and repairing the defects in accordance with a kind of defect (defective mode).

In one embodiment, a storage capacitance formed in conjunction with the pixel electrodes is connected to a scanning line adjacent to another scanning line connected to the pixel electrodes with the pixel electrodes interposed therebetween.

In another embodiment, the storage capacitance formed in conjunction with the pixel electrodes is connected to a common line.

In still another embodiment, the active matrix substrate includes spare lines insulated from the signal lines and formed so as to be crossed with each other, and one of the same signal as that applied to the counter electrodes and the same signal as that applied to the scanning lines is applied to the spare lines.

Thus, the invention described herein makes possible the advantages of (1) providing a method and an apparatus for detecting the defects of an active matrix substrate or an active matrix liquid crystal panel under a Cs-on-Gate structure, a Cs-on-Common structure, or a redundant structure in order to detect a defective mode which may become defective in the future but which can not be inspected by a conventional method, or a defective mode which can not be recognized before the next mounting step (in a module condition); and (2) providing a method for repairing the defective portions based on the detected defective mode.

These and other advantages of the present invention will become apparent to those skilled in the art upon reading and understanding the following detailed description with reference to the accompanying figures.

BRIEF DESCRIPTION OF THE DRAWINGS

FIG. 7 is a schematic circuit diagram showing an entire active matrix substrate to which a defect detection method for an active matrix substrate according to a first example of the present invention is applied.

FIG. 8 is a block diagram showing an apparatus for detecting the defects of the active matrix substrate according to the first example of the present invention.

FIG. 15 is a schematic circuit diagram showing an entire active matrix substrate to which a defect detection method for an active matrix substrate according to a second example of the present invention is applied.

DESCRIPTION OF THE PREFERRED EMBODIMENTS

Figure 1:
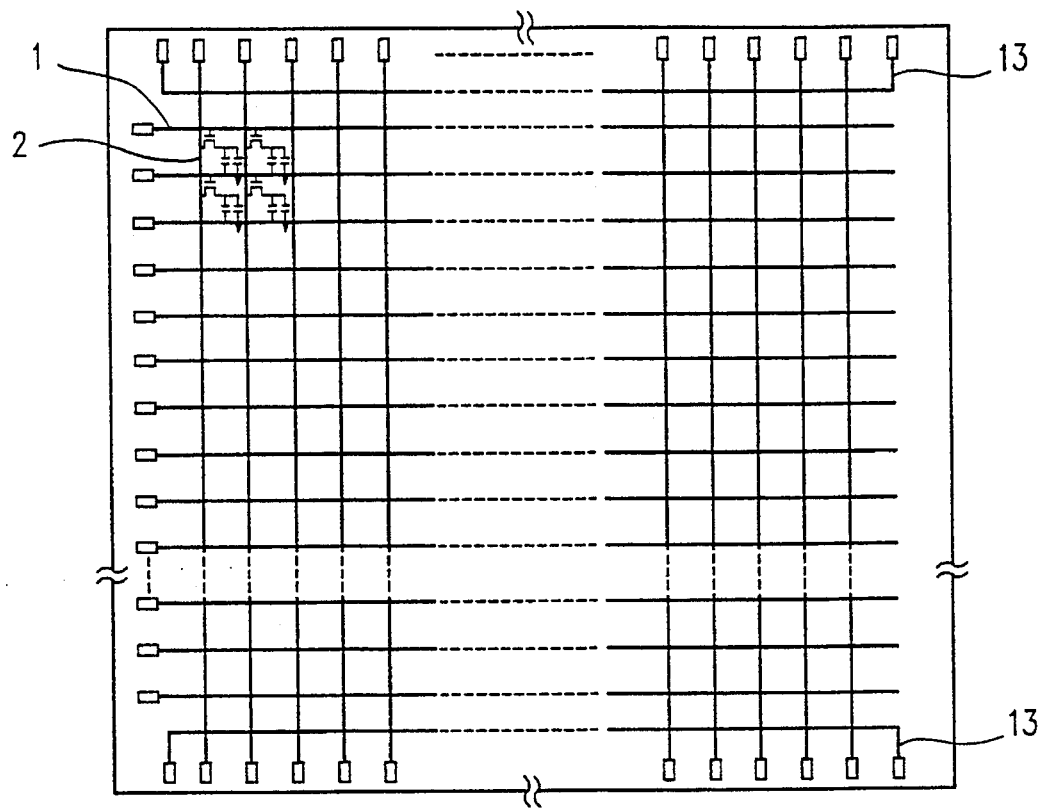
FIG. 1 is a schematic circuit diagram showing an active matrix substrate having a Cs-on-Gate structure.

According to one aspect of the present invention, there is provided a method for detecting the defects of an active matrix substrate having the structure described below, i.e. a so-called Cs-on-Gate structure. In the active matrix substrate with the Cs-on-Gate structure, a plurality of pixel electrodes and TFTs for driving the respective pixel electrodes are arranged in a matrix fashion on an insulating substrate; the respective pixel electrodes are connected through the TFTs to the scanning lines and the signal lines which are connected to the TFTs and formed so as be crossed with each other; the storage capacitance formed in connection with each of the pixel electrodes is connected to a scanning line which is adjacent to another scanning line connected to the pixel electrode, and the pixel electrode is interposed between the two scanning lines. The "inspection" herein refers to the confirmation of the existence/absence of the defects, and the "detection" refers to the filtering of some portions which have inferior properties but which can not be confirmed to be defective in accordance with an ordinary or conventional inspection method.

The defects of this active matrix substrate may be detected in the following manner. First, an apparatus for detecting the defects and the active matrix substrate are disposed so as to be opposed to each other. The connection terminals of the detection apparatus are connected to the respective scanning lines and signal lines. Under such a state, a voltage, higher than a commonly used driving voltage supplying alternately an ON signal determining one frame period and an OFF signal succeeding the ON signal, is transformed, for example, into a signal having a voltage several times higher than the common driving voltage. Then the voltage higher than the commonly used voltage is applied automatically or manually to the portions between the scanning lines and the signal lines of the active matrix substrate during a predetermined time period. As a result, the degraded insulation properties at the crossings of the bus lines are further degraded to generate a leakage current. Accordingly, it is possible to detect in advance the portions where a leakage current causing a defect is likely to generate in the future because of the stress. In order to conduct this detection, it is suitable to apply a voltage 1.5 to 3 times higher than the commonly used driving voltage during a time period of about 1 second. In general, an applied voltage and an applying time period are set at such values as inferior properties may not be generated in normal TFTs.

Furthermore, a defective mode to be detected may be made more extensive. The defect detection may be conducted in the following manner with respect to an active matrix liquid crystal panel including an active matrix substrate with the Cs-on-Gate structure, a counter substrate opposed to the active matrix substrate, and the liquid crystal filled between the pair of substrates.

First, the connection terminals of the defect detection apparatus are respectively connected to the scanning lines, the signal lines, the spare lines, and the counter electrodes. Under such a state, a voltage, higher than a commonly used driving voltage supplying alternately an ON signal determining one frame period and an OFF signal succeeding the ON signal, is transformed into a signal having a voltage several times higher than the commonly used driving voltage. Next, the voltage higher than the commonly used voltage is applied automatically or manually to the portions between the scanning lines and the signal lines of the active matrix liquid crystal panel during a predetermined time period. Then, a scanning signal applied to the scanning lines is also applied to the spare lines and a counter electrode signal is supplied to the spare line. As a result, a defective mode of the spare line to be generated in the next mounting step may be detected beforehand.

In both the active matrix substrate and the active matrix liquid crystal panel, it is possible to repair the defects by providing an appropriate treatment for the detected defective portions.

According to another aspect of the present invention, there is provided a method for detecting the defects of an active matrix substrate with the structure described below, i.e. a so-called Cs-on-Common structure. In the active matrix substrate with the Cs-on-Common structure, a plurality of pixel electrodes and TFTs for driving the respective pixel electrodes are arranged in a matrix fashion on an insulating substrate; the respective pixel electrodes are connected through the TFTs to the scanning lines and the signal lines which are connected to the TFTs and formed so as be crossed with each other; the storage capacitance formed in connection with each of the pixel electrodes is connected to a common line. In addition, a method for detecting the defects of an active matrix substrate including spare lines which are insulated from the signal lines and formed so as to be crossed to each other is also provided.

The defects of this active matrix substrate may be detected in the following manner. First, a defect detection apparatus and the active matrix substrate are disposed so as to be opposed to each other. The connection terminals of the defect detection apparatus are connected to the respective scanning lines, signal lines, and common electrodes. Under such a state, a voltage, higher than a commonly used driving voltage supplying alternately an ON signal determining one frame period and an OFF signal succeeding the ON signal, is transformed, for example, into a signal having a voltage several times higher than the commonly used driving voltage. Then the voltage higher than the commonly used voltage is applied automatically or manually to the scanning lines of the active matrix substrate during a predetermined time period. As a result, the degraded insulation properties at the crossings of the bus lines is further degraded to generate a leakage current. Accordingly, it is possible to detect in advance the portions where a defect caused by a leakage current is likely to generate in the future because of the stress. In order to conduct this detection, it is suitable to apply a voltage 1.5 to 3 times higher than the voltage commonly used for a display apparatus during a time period of about 1 second. In general, an applied voltage and an applying time period are set at such values as inferiority may not be generated in normal TFTs.

Furthermore, the defect inspection mode to be detected may be made more extensive. The defect detection may be conducted in the following manner with respect to an active matrix liquid crystal panel including an active matrix substrate under the Cs-on-Common structure, a counter substrate opposed to the active matrix substrate, and the liquid crystal filled between the pair of substrates.

First, the connection terminals of the defect detection apparatus are respectively connected to the scanning lines, the signal lines, the spare lines, and the counter electrodes. Under such a state, a voltage supplying alternately an ON signal determining one frame period of a liquid crystal display apparatus and an OFF signal succeeding the ON signal, is transformed into a signal having a voltage several times higher than the original voltage. Next, the voltage is applied automatically or manually to the portions between the scanning lines and the signal lines of the active matrix liquid crystal panel during a predetermined time period. Then, a scanning signal applied to the scanning lines is also applied to the spare lines. Furthermore, a voltage supplying alternately an ON signal determining one frame period and an OFF signal succeeding the ON signal is applied to the portions between the scanning lines and the signal lines of the active matrix liquid crystal panel and a counter electrode signal is supplied to the spare line. As a result, a defective mode of the spare line to be generated in the next mounting step may be detected beforehand. In addition, the defects of a substrate with a Cs-on-Gate structure having spare lines may also be detected in the same manner.

Alternatively, a voltage supplying alternately an ON signal determining one frame period and an OFF signal succeeding the ON signal is transformed into a signal having a voltage several times higher the original voltage and then applied automatically or manually to the portions between the scanning lines and the signal lines of the active matrix liquid crystal panel during a predetermined time period and a scanning signal applied to the scanning lines is also applied to the common lines. Accordingly, it is possible to detect beforehand the portions where a defect caused by a leakage current is likely to appear in the future owing to the stress.

In both the active matrix substrate and the active matrix liquid crystal panel, it is possible to repair the defects by providing an appropriate treatment for the detected defective portions.

Hereinafter, the present invention will de described by way of more specific examples with reference to the accompanying drawings.

EXAMPLE 1

Figure 2:
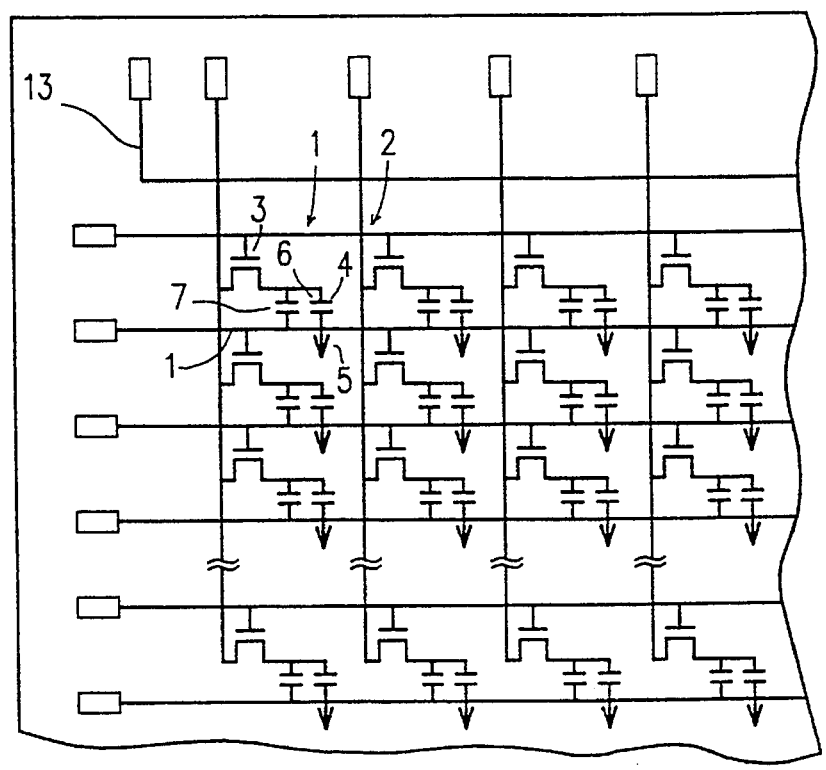
FIG. 2 is an enlarged view showing a part of the active matrix substrate shown in FIG. 1.
Figure 3:
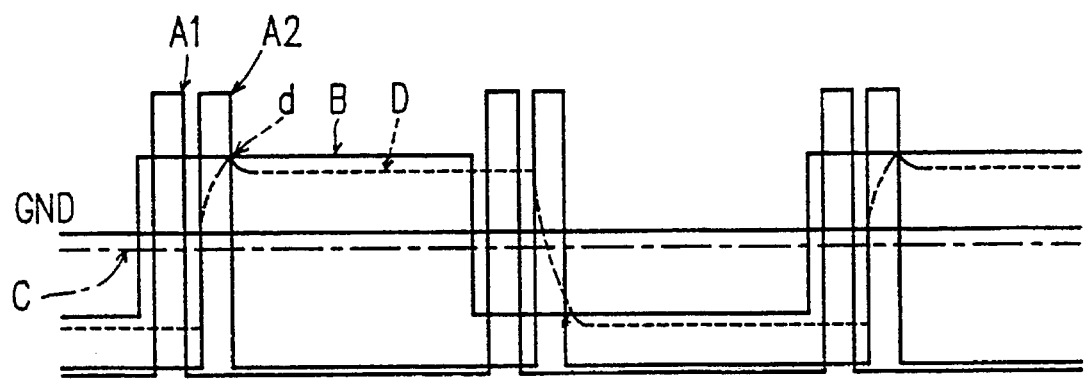
FIG. 3 is a view showing the waveforms of the signals used for inspecting the defects of an active matrix substrate having a Cs-on-Gate structure in accordance with a conventional inspection method.

According to a first example of the present invention, a method and an apparatus are provided for detecting the defects of an active matrix substrate having the Cs-on-Gate structure as shown in FIGS. 1 and 2 and a liquid crystal panel including such an active matrix substrate. In this example, the active matrix substrate is constructed in the same manner as described in the Background of the Invention, so the detailed description thereof will be omitted herein.

FIG. 7 shows a general construction of the active matrix substrate to be inspected and a part of the defect detection apparatus according to this example. The defect detection apparatus of this invention includes flexible wiring substrates, namely tape automated bondings (hereinafter, simply referred to as TABs) 8, 9a, and 9b. In the TAB 8, as shown in FIG. 7, odd-numbered gate bus lines 1 are connected to each other and to a terminal A1, and even-numbered gate bus lines 1 are connected to each other and to a terminal A2. In the TAB 9a, the source bus lines 2 are connected through a common line to a terminal B, and one of the spare lines 13 is connected to a terminal D. In the TAB 9b, the other spare line 13 is connected to a terminal D. A terminal C is connected to a counter electrode 5.

FIG. 8 is a circuit diagram of a signal supplying portion which supplies inspection signals to the respective terminals A1, A2, B, C, and D and belongs to the defect detection apparatus. This signal supplying portion includes: a reference signal generator 14; a frequency divider 15 for dividing the frequency of the signal output from the reference signal generator 14; nine signal generators 16 to 24 to which the signals output from the frequency divider 15 are input; five switches 25 to 29; and five inspection/detection terminals 30 to 34.

Figure 9A:
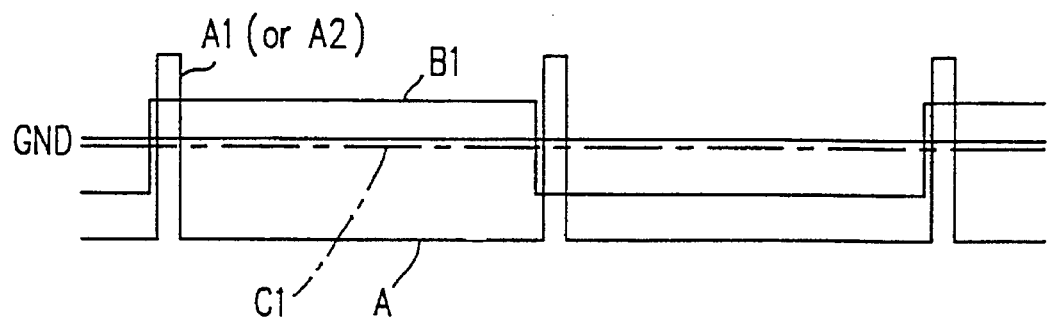
FIGS. 9A through 9C are views showing the waveforms of the signals used in accordance with a method and an apparatus for detecting the defects of the active matrix substrate according to the first example of the present invention.
Figure 9B:
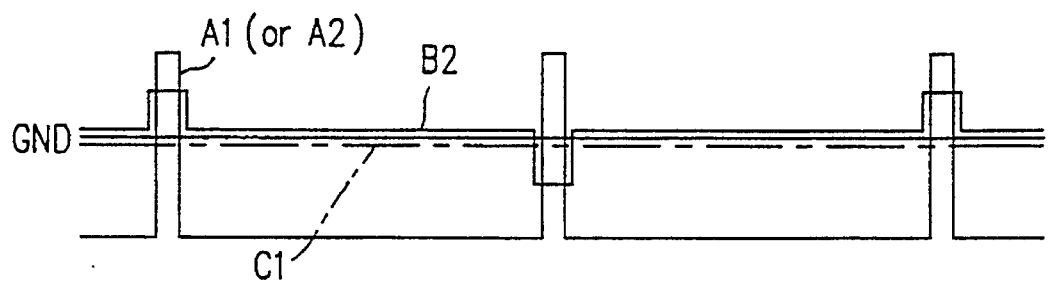
Figure 9C:
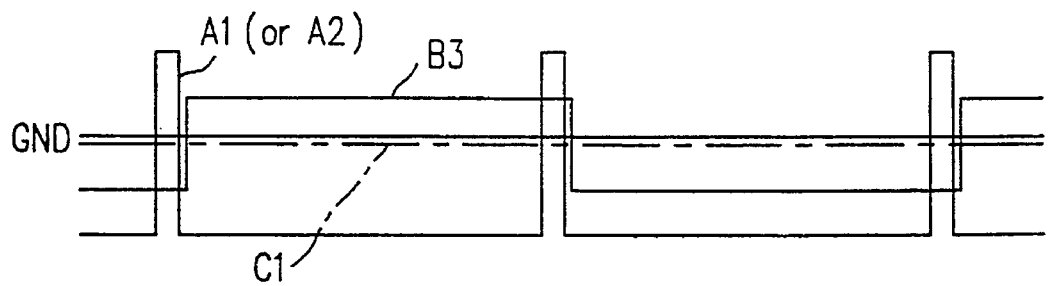

A B1 signal generator 16 generates a signal B1 shown in FIG. 9A, a B2 signal generator 17 generates a signal B2 shown in FIG. 9B, and a B3 signal generator 18 generates a signal B3 shown in FIG. 9C. The signal B1 maintains a constant voltage level after the signal B1 is written through the TFTs 3 into the respective pixels until the next frame is written. The signal B2 is a signal having a variable voltage level during a time period from the application of a writing signal to the respective pixels until the application of the writing signal of the next frame thereto. The signal B3 is also a signal having a variable voltage level during a time period from the application of a writing signal to the respective pixels until the application of the writing signal of the next frame thereto. All these signals B1, B2, and B3 are supplied via the inspection/detection terminal 30 to the source bus lines 2 by selectively controlling the ON/OFF states with the switch 25 including three terminals 25a, 25b, and 25c. The signals B1, B2 and B3 are supplied via the inspection/ detection terminal 31 to the spare line 13 by selectively controlling the ON/OFF states with a switch 26. In the present invention, the detection can be performed using any one of the signals B1, B2 and B3.

Figure 10A:
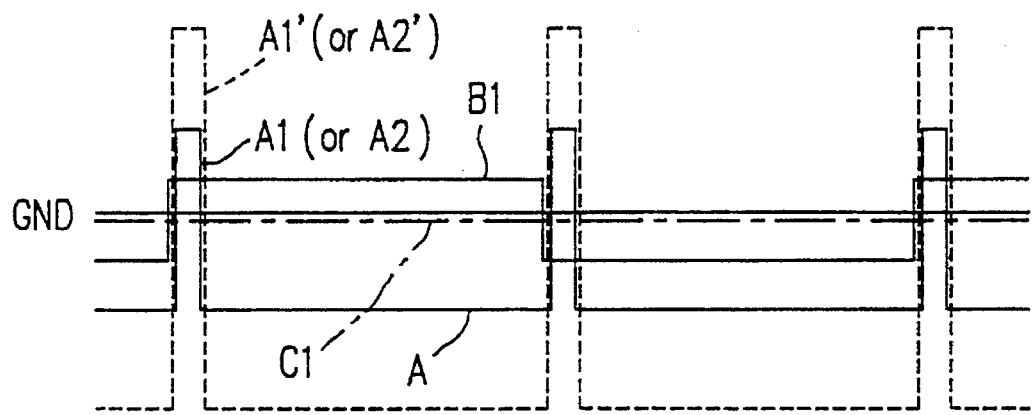
FIGS. 10A through 10C are views showing the waveforms of the detection signals used in accordance with a method and an apparatus for detecting the defects of the active matrix substrate according to the first example of the present invention.
Figure 10B:
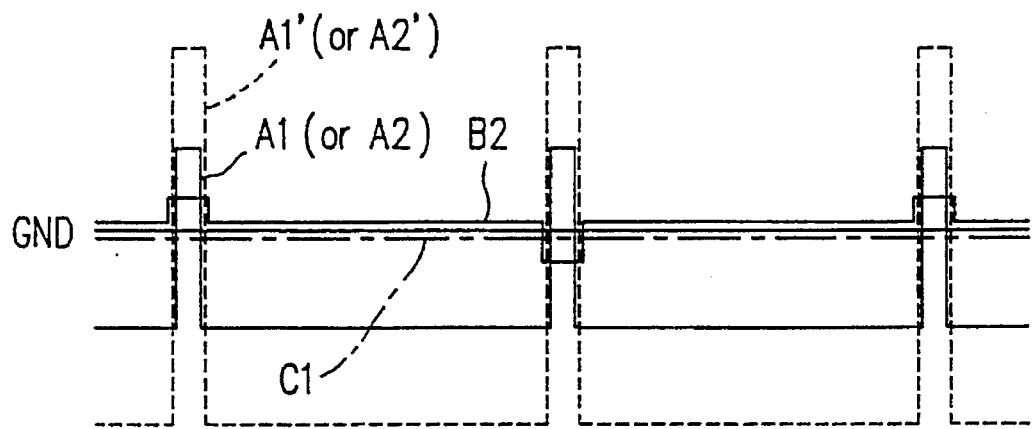
Figure 10C:
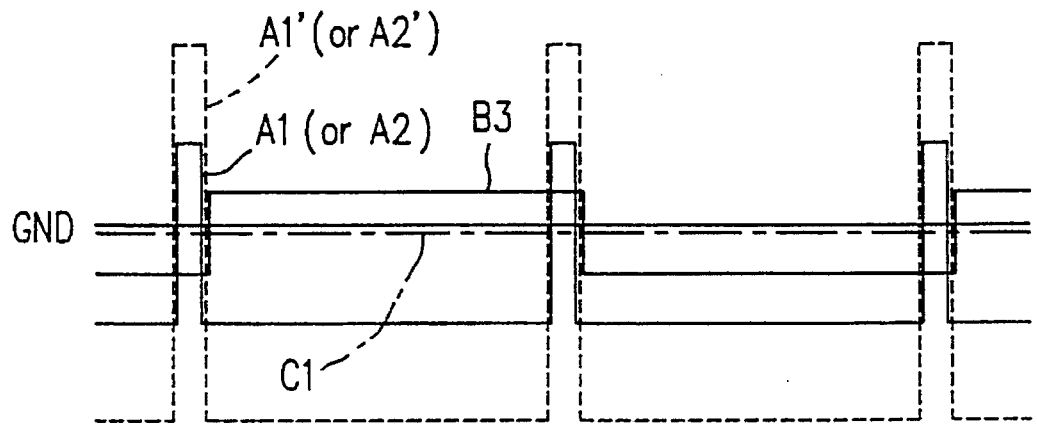

A signal generator 20 for odd-numbered gate lines generates a signal A1 for controlling the ON/OFF states of the gate bus lines 1, as shown in FIGS. 9A, 9B and 9C, and supplies the signal A1 via an inspection/detection terminal 32 to the odd-numbered gate bus lines 1. A signal generator 21 for even-numbered gate lines generates a signal A2 for controlling the ON/OFF states of the gate bus lines 1, as shown in FIGS. 9A, 9B and 9C, and supplies the signal A2 via an inspection/detection terminal 33 to the even-numbered gate bus lines 1. A detection signal generator 19 for odd-numbered gate lines generates a signal A1' for controlling the ON/OFF states of the gate bus lines 1, as shown in FIGS. 10A, 10B and 10C, and supplies the signal A1' via the inspection/detection terminal 32 to the odd-numbered gate bus lines 1. A detection signal generator 22 for even-numbered gate lines generates a signal A2' for controlling the ON/OFF states of the gate bus lines 1, as shown in FIGS. 10A, 10B and 10C, and supplies the signal A2' via the inspection/detection terminal 33 to the even-numbered gate bus lines 1. The signal A1' is supplied via the inspection/ detection terminal 31 to the spare line 13 by selectively controlling the ON/OFF states with the switch 26. Although the pair of signals A1 and A2 have the same waveform, these signals A1 and A2 are supplied to the gate bus lines 1 at slightly different timings. In the same way, although the pair of signals A1' and A2' have the same waveform, these signals A1' and A2' are supplied to the gate bus lines 1 at slightly different timings. The same fact is true of the examples to be described later with reference to FIGS. 10, 12 and 14.

The above-described circuit, signals and the like are employed in the case of detecting and inspecting an active matrix substrate.

Figure 6:
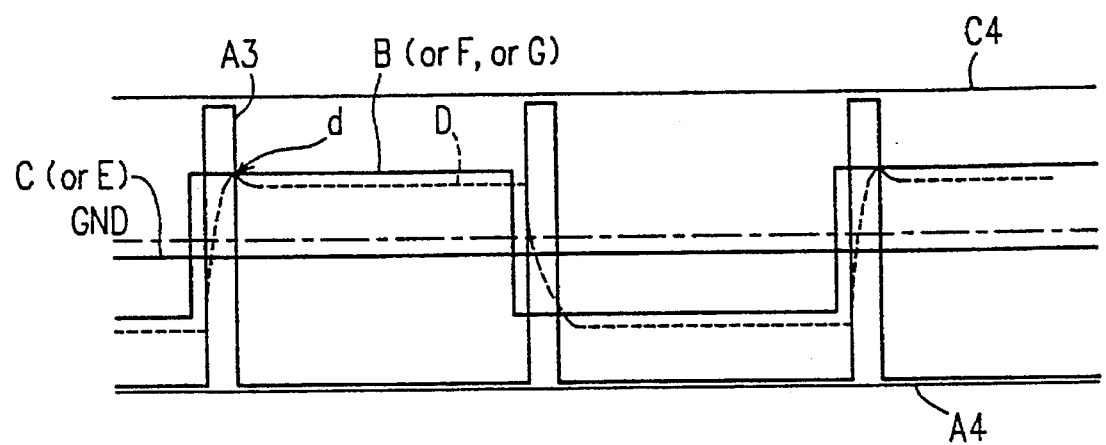
FIG. 6 is a view showing the waveforms of the signals used for inspecting the defects of an active matrix substrate having a Cs-on-Common structure in accordance with a conventional inspection method.

In the case of inspecting an active matrix liquid crystal panel, a signal generator 23 for counter electrodes generates a signal C1, as shown in FIGS. 9A, 9B and 9C, having a constant voltage level fixed at that of the counter electrodes adjusted to be an optimal value so as to eliminate flickers, and supplies the signal C1 via an inspection/detection terminal 34 to the counter electrodes 5 by selectively controlling the ON/OFF states with a switch 29. A signal generator 24 for counter electrodes generates a signal (the same kind of signal as the signal C for making a DC level variable shown in FIG. 6; hereinafter this signal will be denoted by C2) having a variable voltage level ranging from a voltage for turning a TFT ON to a voltage for turning a TFT OFF, and then supplies the signal C2 via the inspection/detection terminal 34 to the counter electrodes 5 by selectively controlling the ON/OFF states with the switch 29.

The signal B1 output from the B1 signal generator 16, the signal B2 output from the B2 signal generator 17, and the signal B3 output from the B3 signal generator 18 are respectively output to the three terminals 25a, 25b and 25c of the switch 25. The switch 25 selects one of the three terminals 25a, 25b and 25c and then supplies the signal B1, B2 or B3 to the inspection/detection terminal 30. The inspection/detection terminal 30 is connected via the TAB 9a to the source bus lines 2.

The ON/OFF state controlling signal A1 output from the signal generator 20 for odd-numbered gate lines and the ON/OFF state controlling signal A1' output from the detection signal generator 19 for odd-numbered gate lines are respectively output to two terminals 27a and 27b of the three terminals 27a, 27b and 27c of the switch 27, while the signal C2 output from the signal generator 24 for counter electrodes is output to the remaining terminal 27c. The switch 27 selects one of the three terminals 27a, 27b and 27c and then supplies the signal A1, A1' or C2 to the inspection/detection terminal 32. The inspection/detection terminal 32 is connected via the TAB 8 to the odd-numbered gate bus lines 1.

The ON/OFF state controlling signal A2 output from the signal generator 21 for even-numbered gate lines and the ON/OFF state controlling signal A2' output from the detection signal generator 22 for even-numbered gate lines are respectively output to two terminals 28a and 28c of the three terminals 28a, 28b and 28c of the switch 28, while the signal C2 output from the signal generator 24 for counter electrodes is output to the remaining terminal 28b. The switch 28 selects one of the three terminals 28a, 28b and 28c and then supplies the signal A2, A2' or C2 to the inspection/detection terminal 33. The inspection/detection terminal 33 is connected via the TAB 8 to the even-numbered gate bus lines 1.

The signal C1 output from the signal generator 23 for counter electrodes and the signal C2 output from the signal generator 24 for counter electrodes are respectively output to the two terminals 29a and 29b of the switch 29, and the switch 29 selects one of the two terminals 29a and 29b and then supplies the signal C1 or C2 to the inspection/detection terminal 34. This inspection/detection terminal 34 is connected via the TABs 9a and 9b to the terminal C of the counter electrodes 5.

The signals B1 to B3 output from the switch 26, and the ON/OFF state controlling signal A1 output from the signal generator 20 for odd-numbered gate lines or the ON/OFF state controlling signal A1' output from the detection signal generator 19 for odd-numbered gate lines are respectively output to two terminals 26a and 26b of the three terminals 26a, 26b and 26c of the switch 26, and the signal C1 or C2 output from the switch 29 is output to the remaining terminal 26c. The switch 26 selects one of the three terminals 26a, 26b and 26c and then supplies the signal C1 or C2 to the inspection/detection terminal 31. This inspection/detection terminal 31 is connected through the TABs 9a and 9b to both spare lines 13. The switches 25 to 29 are controlled by a controller (not shown); two switches 27 and 28 out of the four operate in combination with each other.

Next, a method for detecting and inspecting the defects of the active matrix substrate or the active matrix liquid crystal panel by using the above described defect detection apparatus will be described below.

In order to detect the defects, the active matrix substrate or the active matrix liquid crystal panel to be detected is first placed precisely on a predetermined position of the defect detection apparatus, and at the same time, the TABs 8, 9a and 9b are disposed along the outer periphery of the active matrix substrate or the active matrix liquid crystal panel so as to correspond to the positions of the terminals of the substrate or those of the terminals of the panel, and then the terminals of the active matrix substrate or the active matrix liquid crystal panel and the terminals of the TABs 8, 9a and 9b are made to come into contact with each other. For stabilizing this contact, a pressure may be applied thereto by using a spring, a clip or the like. The inspection TAB 8 is connected to the gate bus lines 1, and the inspection TAB 9 is connected to the respective terminals (not shown) of the source bus lines 2, the spare lines 13 (and the counter electrodes in the case of inspecting the liquid crystal panel).

Thereafter, the switch 26 selects the terminal 26b and supplies the signal A1' output from the detection signal generator 19 for odd-numbered gate lines to the spare lines 13; the switch 27 selects the terminal 27a and supplies the signal A1' output from the detection signal generator 19 for odd-numbered gate lines to the odd-numbered gate bus lines 1; and the switch 28 selects the terminal 28a and supplies the signal A2' output from the detection signal generator 22 for even-numbered gate lines to the even-numbered gate bus lines 1. The switches 25 and 29 may be connected to any terminals. Under these conditions, the respective signals are supplied during a predetermined period of time. In this example, a detection signal may have a voltage 1.5 to 3 times higher than a driving voltage commonly used for driving an active matrix liquid crystal display apparatus, and the voltage is applied for one second. This applied voltage and the application time period may be set at such values as a normal TFT may not become damaged and an inferior TFT may become defective. As a result, the insulation properties already degraded at the crossings of the bus lines are further degraded, thereby generating a leakage current. This is why the detection is conducted with respect to the insulation properties of the crossings of the gate bus lines 1 and the source bus lines 2 of the active matrix substrate or liquid crystal panel, and to the insulation properties of the crossings of the source bus lines 2 and the spare lines 13 thereof.

Next, in order to conduct ordinary defect inspection, the switch 26 selects the terminal 26c and supplies the signal C1 or C2 output from the signal generator 23 or 24 for counter electrodes to the spare lines 13; the switch 27 selects the terminal 27a and supplies the signal A1 output from the signal generator 20 for odd-numbered gate lines to the odd-numbered gate bus lines 1; and the switch 28 selects the terminal 28a and supplies the signal A2 output from the signal generator 21 for even-numbered gate lines to the even-numbered gate bus lines 1. The switches 25 and 29 may be connected to any terminals. Under these conditions, the portions having inferior insulation properties at the crossings of the source bus lines 2 and the spare lines 13 are inspected. Subsequently, the switch 26 selects the terminal 26a, supplies the signals B1 to B3 output from the B1 to B3 signal generators 16 to 18 to the spare lines 13, and then selectively controls the ON/OFF states with the switches 25 and 27 to 29, thereby inspecting the presence/absence of the leakage current between the gate bus lines and the source bus lines and other respective point defects and line defects.

After all of the above-mentioned inspections are over, the supply of the signals to the respective portions is stopped, the connection to the TABs 8, 9a and 9b is cut, and then the active matrix substrate or the active matrix liquid crystal panel is removed from the defect detection apparatus. The active matrix substrate or the active matrix liquid crystal panel is screened based on the presence or the absence of the defects; that is to say, an unrepairable one is eliminated and a repairable one is repaired.

Hereinafter, the procedures to be conducted with respect to the respective defective portions for detecting and inspecting the defects will be described.

(1) In the case where line defects occur between a gate bus line and a source bus line because of the generation of the leakage current, the detection and the inspection of the defects are conducted using the following procedure.

Figure 11A:
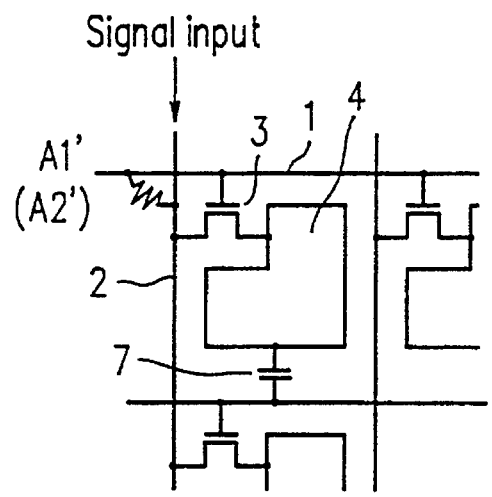
FIG. 11A is a view schematically showing a defective condition to be detected by the method of the first example of the present invention in the case where a line defect is displayed because of a leakage current generated at a crossing of a gate bus line and a source bus line.

In this case, as shown in FIG. 11A, the signal A1' or A2' is applied to the gate bus line 1, so that a leakage current is generated in the portion having the degraded insulation properties between the gate bus line 1 and the source bus line 2. As a result, the display quality becomes inferior along the pixel electrodes arranged in a horizontal line and connected to the gate bus line 1 where the leakage current has been generated, and along the pixel electrodes arranged in a vertical line and connected to the source bus line 2 where the leakage current has been generated. Accordingly, these line defects are displayed in a cross shape.

In the case where such defects are generated, the amplitude between a gate voltage for turning the TFT 3 OFF and a gate voltage for turning the TFT 3 ON becomes smaller than the amplitude under a normal state being affected by the signal of the source bus line 2. As a result, neither the ON resistance of the TFT 3 nor the OFF resistance thereof may be maintained sufficiently and therefore an apparent behavior of the TFT 3 connected to the source bus line 2 and the gate bus line 1 where the leakage current is generated is similar to that of the TFT 3 having inferior OFF properties. In such a state, the defect inspection is conducted by applying a signal A1 or A2 and the signals B1, B2 and B3 shown in FIGS. 12B and 12C. In this case, the horizontal line displayed as a line defect shown in FIG. 12C may be observed more visually and clearly than that shown in FIG. 12B, and at the same time, the vertical line displayed by the pixel electrodes connected to the source bus line 2 may also be observed clearly. As a result, the defective portions may be distinguished clearly based on the line defects in a cross shape which may be easily observed.

Figure 11B:
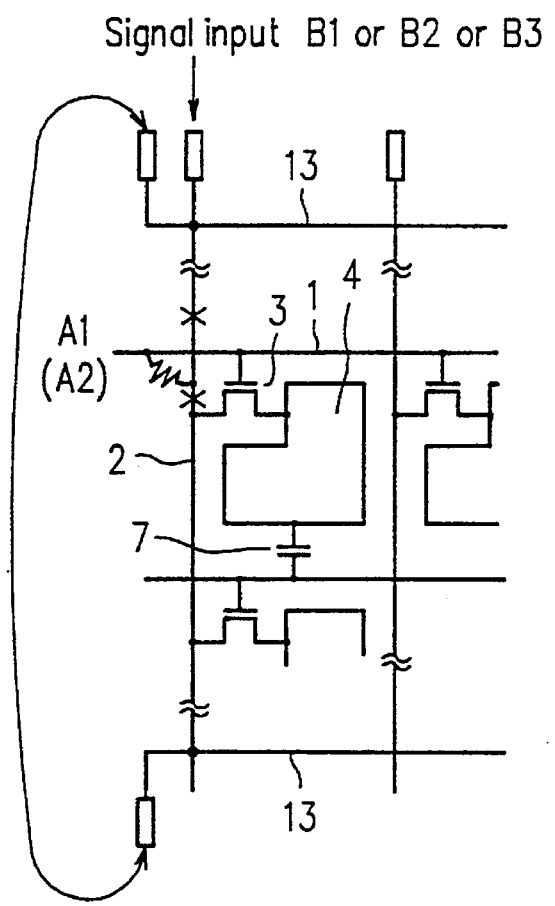
FIG. 11B is a view schematically showing a condition where the line defect shown in FIG. 11A is repaired.
Figure 12A:
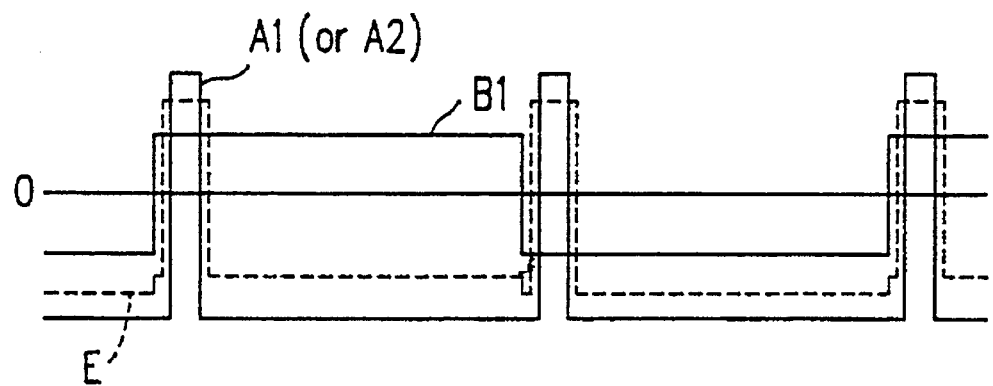
FIGS. 12A through 12C are views showing voltage levels and gate signal waveforms E respectively corresponding to inspection signals B1, B2, and B3 in detecting a line defect displayed because of the leakage current generated at a crossing of a gate bus line and a source bus line.
Figure 12B:
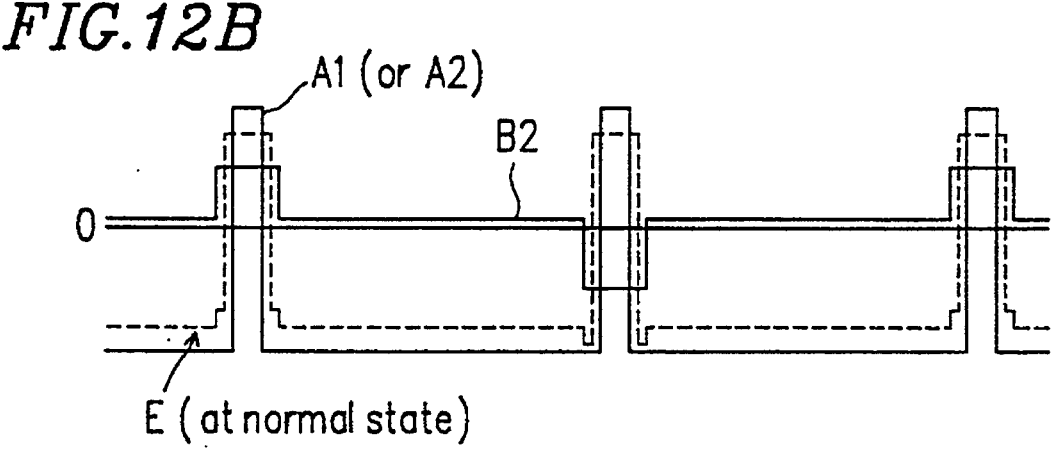
Figure 12C:
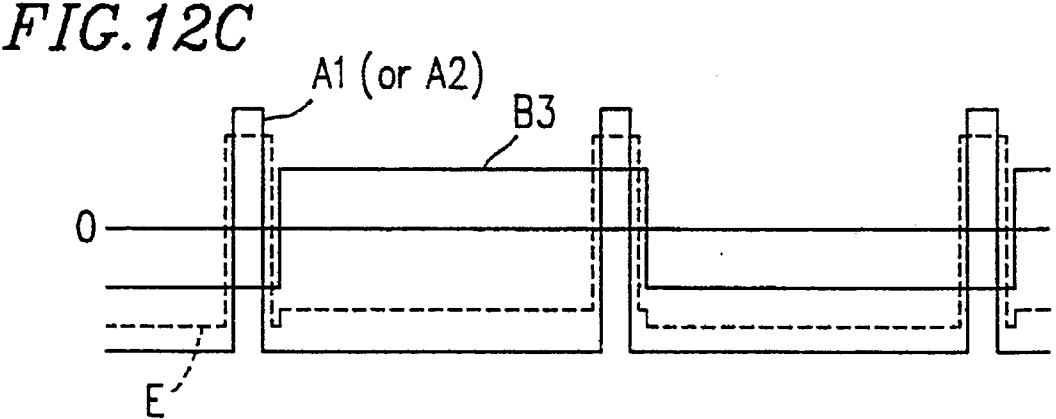

In order to repair such a defect, as shown in FIG. 11B, both ends of the source bus line 2 where the leakage current is generated are cut off with a laser beam or the like; the crossing portion between the source bus line 2 and the spare line 13 is connected to each, also with a laser beam or the like; and a signal is applied to both sides of the source bus line 2. Since the respective potentials of the gate signal waveforms E in the case where the leakage current is generated between the gate bus line 1 and the source bus line 2 vary as shown in FIGS. 12A, 12B and 12C, the defects may be inspected by electrically measuring the potentials without conducting a visual observation.

(2) In the case where line defects occur between a spare line and a source bus line because of the generation of the leakage current, the detection and the inspection of the defects are conducted using the following procedure.

Figure 13A:
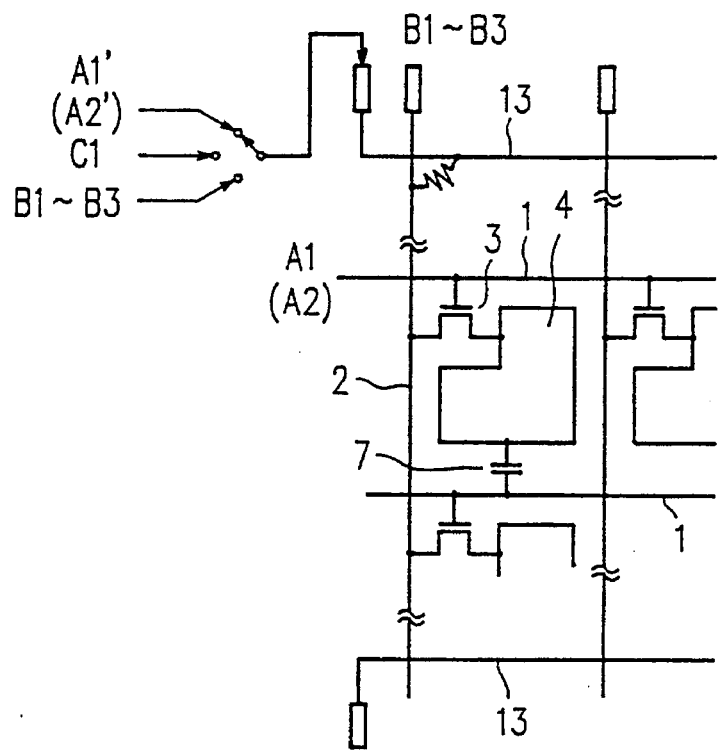
FIG. 13A is a view schematically showing a defective condition to be detected by the method according to the first example of the present invention in the case where a line defect is displayed because of a leakage current generated at a crossing of a spare line and a source bus line.
Figure 14A:
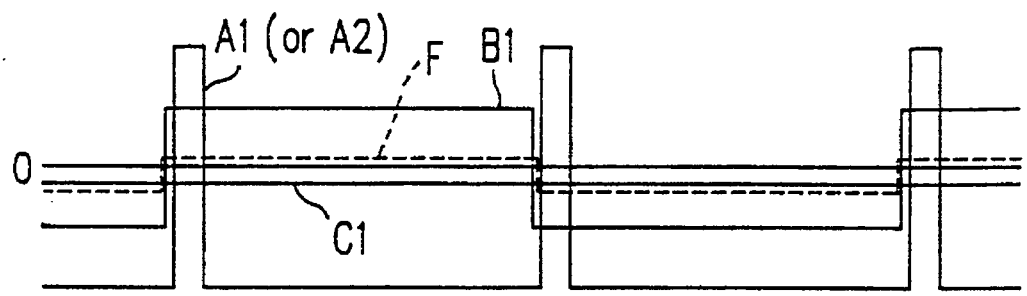
FIGS. 14A through 14C are views showing voltage levels and source signal waveforms F respectively corresponding to inspection signals B1, B2, and B3 in the case where a line defect is to be detected because of the leakage current generated at a crossing of a spare line and a source bus line and a counter electrode signal C1 is supplied to the spare line.
Figure 14B:
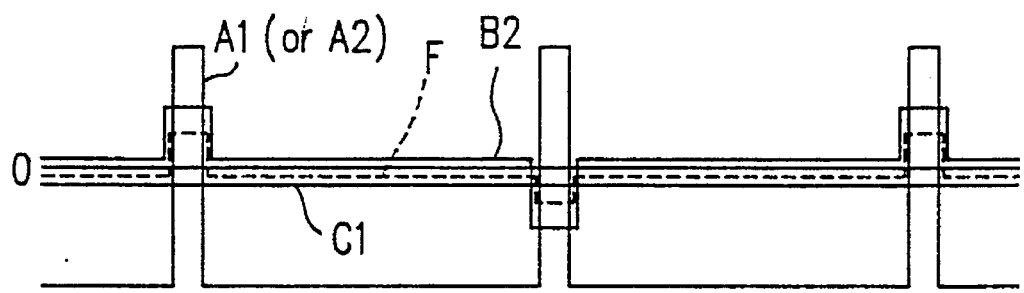
Figure 14C:
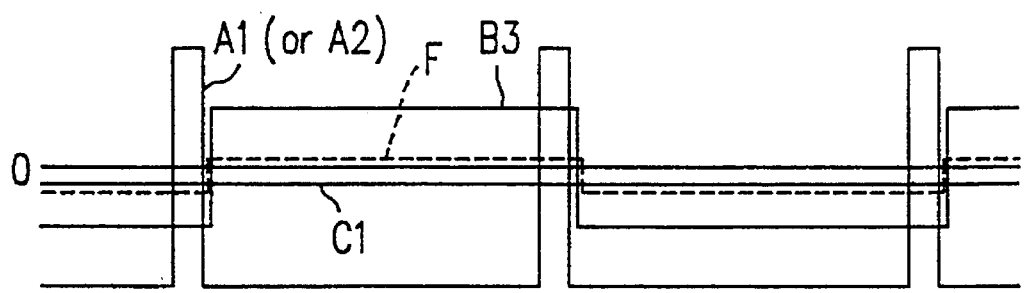

In this case, as shown in FIG. 13A, the signal A1' or A2' is applied to the spare line 13, so that the leakage current is generated in the portion having the degraded insulation properties between the spare line 13 and the source bus line 2. In the case where such a defect is generated, the defect can not be inspected by supplying the signals B1 to B3 to the spare line 13. If the signal C1 is supplied to the spare line 13, resulting display quality becomes inferior along the pixel electrodes arranged in a vertical line and connected to the source bus line 2 where the leakage current is generated. In the case where such a defect is generated, the supply of the counter electrode signal C1 to the spare line 13 causes the amplitude of the source voltage to become smaller than that under a normal state, so that the voltage to be applied to the pixel electrodes 4 is reduced. As a result, no voltage can be applied to the pixel electrodes arranged in a vertical line and connected to the defective portions, thereby generating a bright line (in a Normally White mode). Therefore, these defects may be inspected by supplying signals A1, A2, and C1 as shown in FIGS. 14A, 14B and 14C.

Figure 13B:
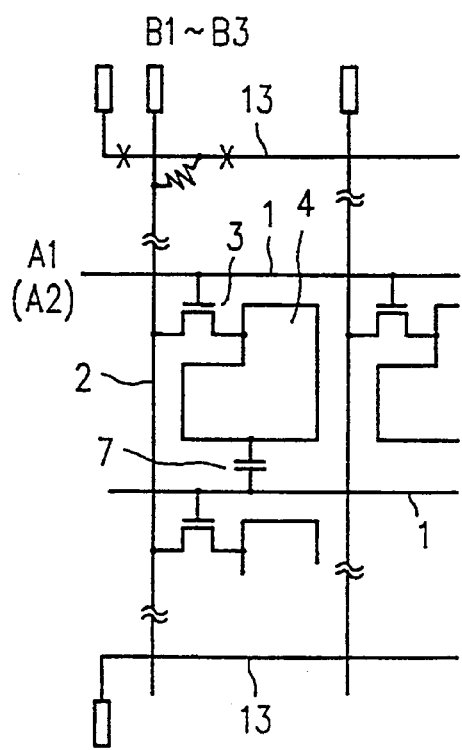
FIG. 13B is a view schematically showing a condition where the line defect shown in FIG. 13A is repaired.

In order to repair such a defect, as shown in FIG. 13B, both ends of the spare line 13 where the leakage current is generated are cut off with a laser beam or the like. If a signal C1 is applied to the spare line 13, then the respective potentials of the source signal waveforms F in the case where the leakage current is generated between the spare line 13 and the source bus line 2 vary as shown in FIGS. 14A, 14B and 14C. Accordingly, the defects may be inspected by electrically measuring the potentials without conducting a visual observation.

In an active matrix substrate with a Cs-on-Gate structure, or in an active matrix substrate with a similar structure, the storage capacitance connected in parallel to the pixels is connected to a scanning line adjacent to another scanning line for driving the pixels. Accordingly, in writing a signal, the scanning line adjacent to another scanning line for driving the pixels is required to be switched into an OFF state. As a result, it is necessary to apply the signals A1 and A2 at different timings. In the drawings, the driving timings of the other signals are different from each other. However, in fact, the signals are driven so that the timings thereof may correspond to each other.

EXAMPLE 2

Figure 4:
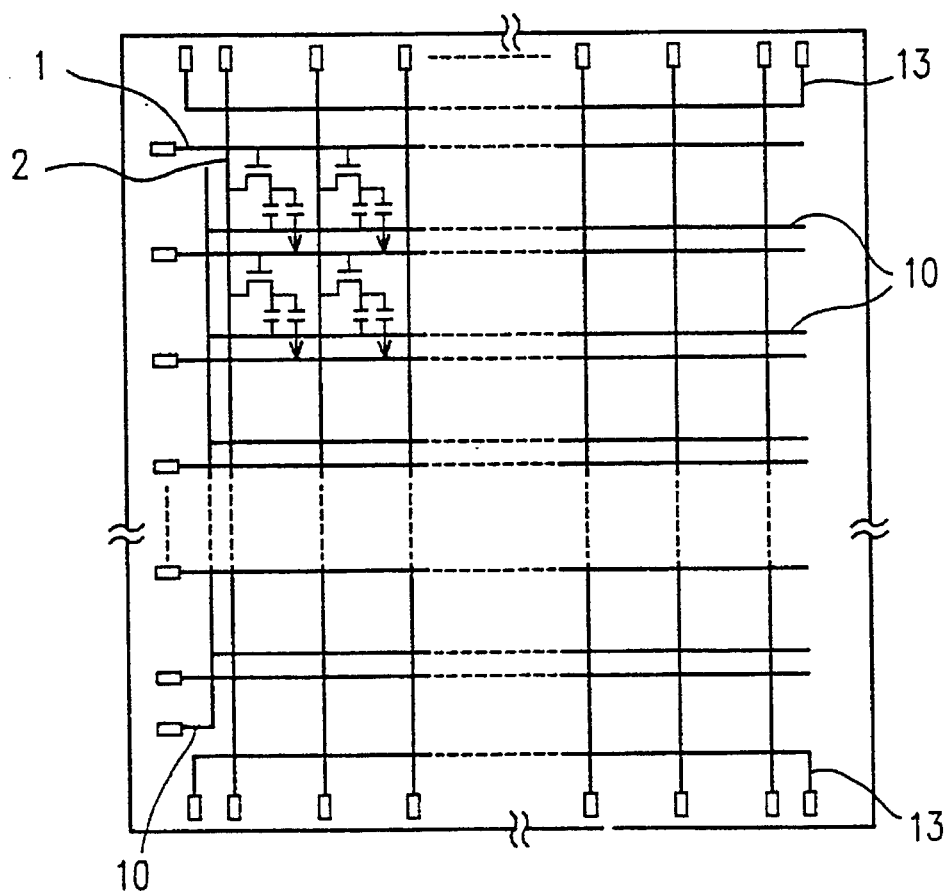
FIG. 4 is a schematic circuit diagram showing an active matrix substrate having a Cs-on-Common structure.
Figure 5:
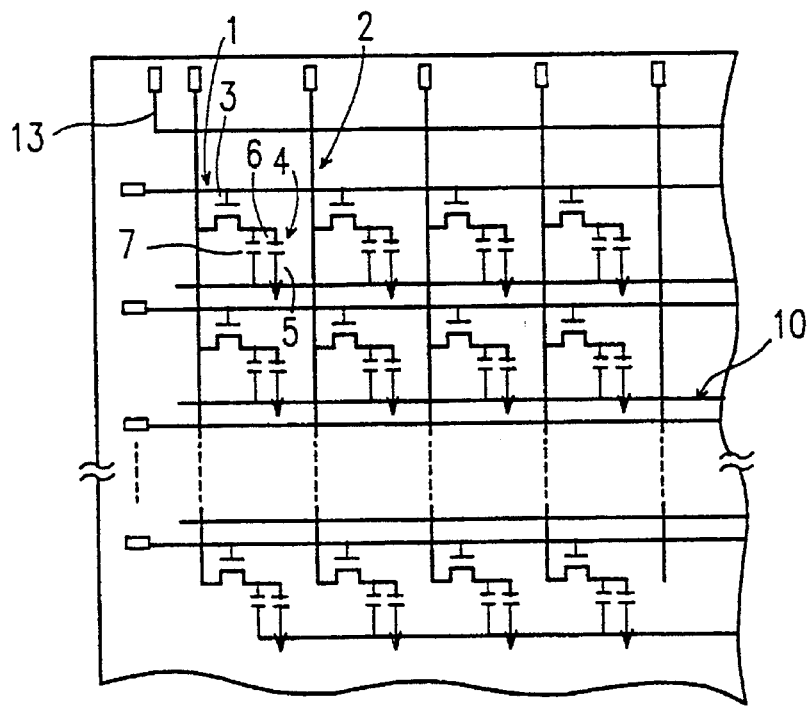
FIG. 5 is an enlarged view showing a part of the active matrix substrate shown in FIG. 4.

According to a second example of the present invention, a method and an apparatus are provided for detecting the defects of an active matrix substrate with the Cs-on-Common structure as shown in FIGS. 4 and 5 and a liquid crystal panel including such an active matrix substrate. In this example, the active matrix substrate is constructed in the same manner as described in the Background of the Invention, so the detailed description thereof will be omitted herein.

FIG. 15 shows a general construction of the active matrix substrate to be inspected and a part of the defect detection apparatus according to this example. The defect detection apparatus of this invention includes TABs 11, 12a, and 12b. In the TAB 11, as shown in FIG. 15, the gate bus lines 1 on one terminal side are connected through a common line to a terminal A3, and the common line 10 for storage capacitance is connected to a terminal E. In the TAB 12a, the source bus lines 2 on one terminal side are connected through a common line to a terminal B and one of the spare lines 13 is connected to a terminal F. In the TAB 12b, the other spare line 13 is connected to a terminal G. A terminal C is connected to a counter electrode 5.

Figure 16:
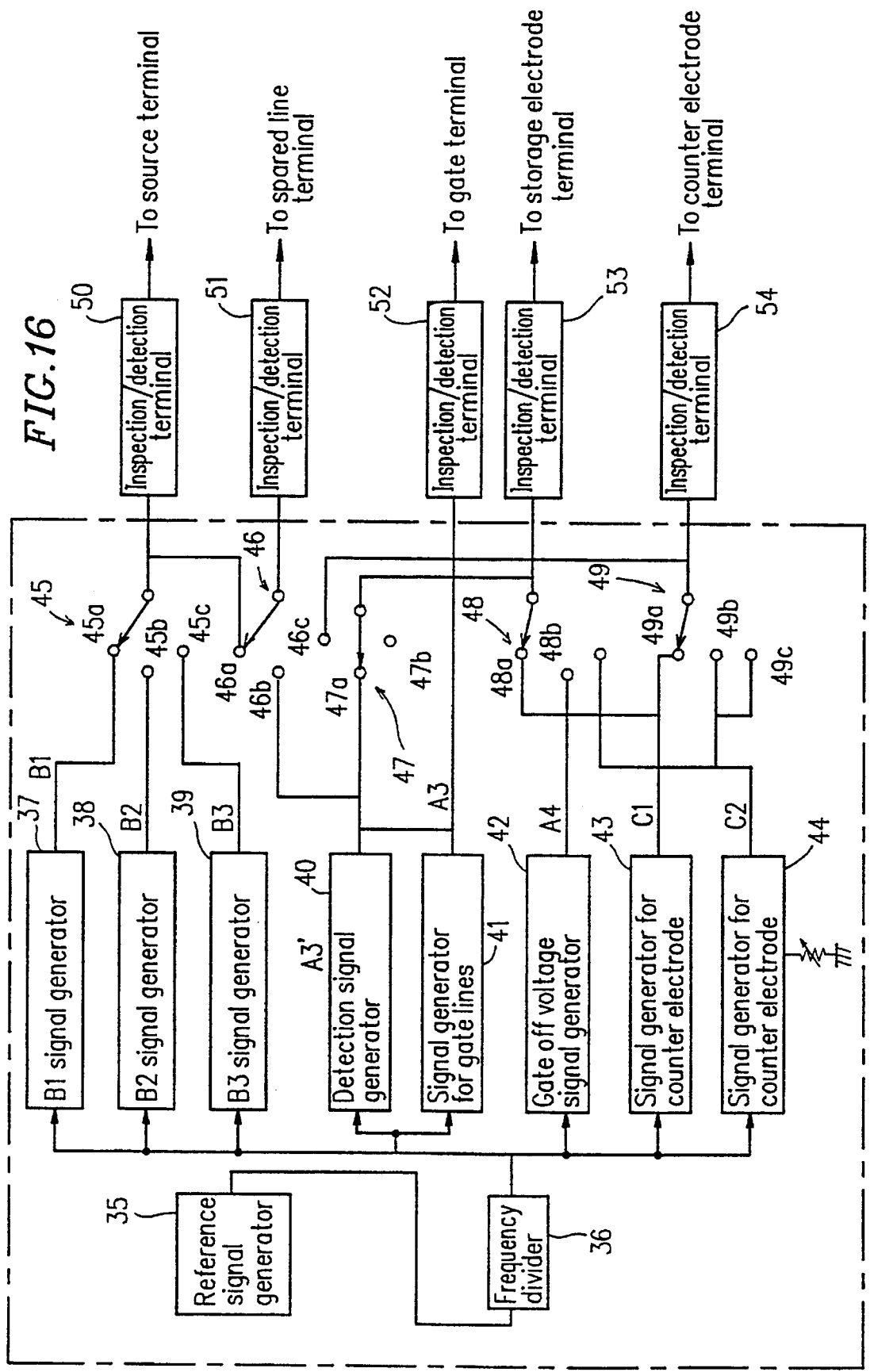
FIG. 16 is a block diagram showing an apparatus for detecting the defects of the active matrix substrate according to the second example of the present invention.

FIG. 16 is a circuit diagram showing a signal supplying portion which supplies inspection signals to the respective terminals A3, B, C, E, F and G and belongs to the defect detection apparatus. As shown in FIG. 16, this signal supplying portion includes: a reference signal generator 35; a frequency divider 36 for dividing the frequency of the signal output from the reference signal generator 35; eight signal generators 37 to 44 to which the signal output from the frequency divider 36 is input; five switches 45 to 49; and five inspection/detection terminals 50 to 54.

Figure 17A:
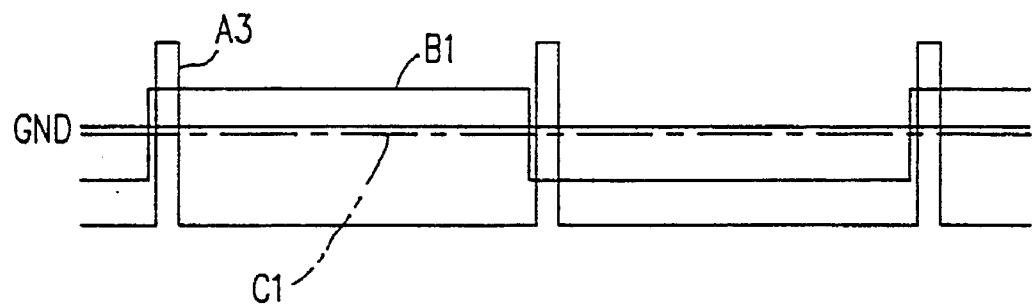
FIGS. 17A through 17C are views showing the waveforms of the signals used in accordance with a method and an apparatus for detecting the defects of the active matrix substrate according to the second example of the present invention.
Figure 17B:
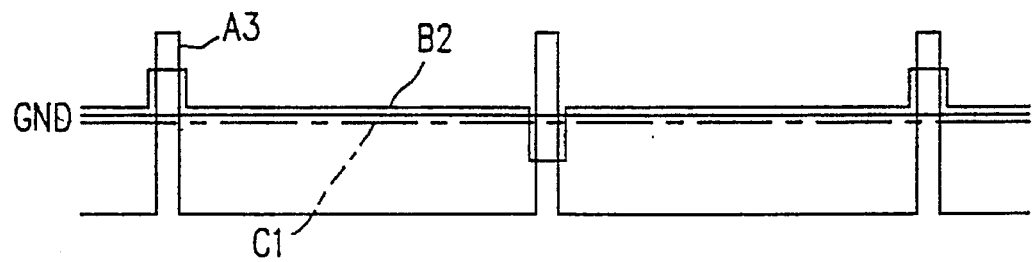
Figure 17C:
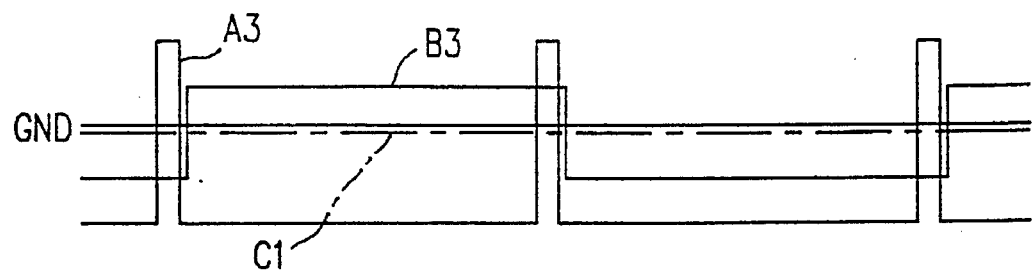

A B1 signal generator 37 generates a signal B1 shown in FIG. 17A, a B2 signal generator 38 generates a signal B2 shown in FIG. 17B, and a B3 signal generator 39 generates a signal B3 shown in FIG. 17C. The signal B1 maintains a constant voltage level after the signal B1 is written through the TFTs 3 to the respective pixels until the next frame is written. The signal B2 is a signal having a variable voltage level during a time period from the application of a writing signal to the respective pixels until the application of the writing signal of the next frame thereto. The signal B3 is also a signal having a variable voltage level during a time period from the application of a writing signal to the respective pixels until the application of the writing signal of the next frame thereto. All these signals B1, B2, and B3 are supplied via the inspection/detection terminals 50 to the source bus lines 2 by selectively controlling the ON/OFF states with the switch 45 including three terminals 45a, 45b, and 45c. The signals B1, B2 and B3 are supplied via the inspection/detection terminal 51 to the spare line 13 by selectively controlling the ON/OFF states with a switch 46.

Figure 18A:
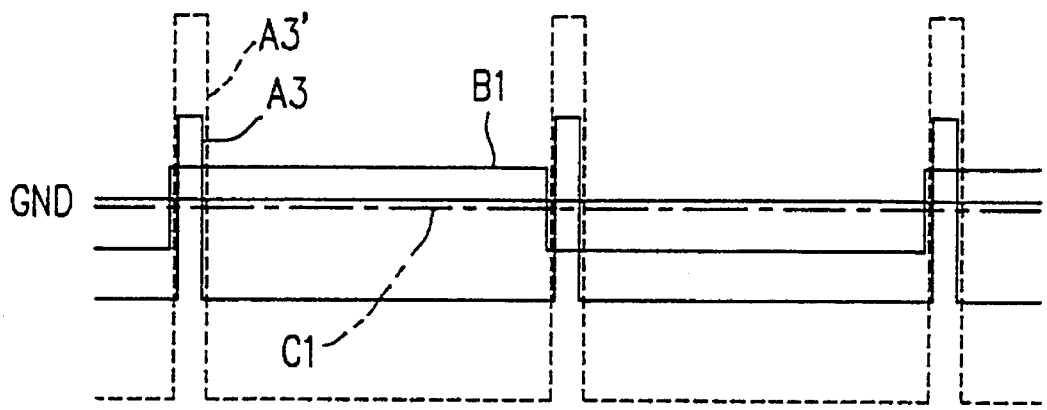
FIGS. 18A through 18C are views showing the waveforms of the detection signals used in accordance with a method and an apparatus for detecting the defects of the active matrix substrate according to the second example of the present invention.
Figure 18B:
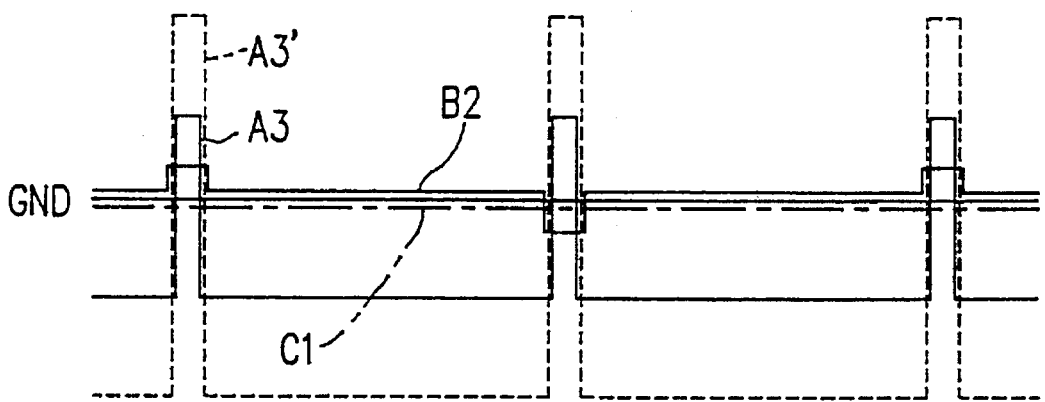
Figure 18C:
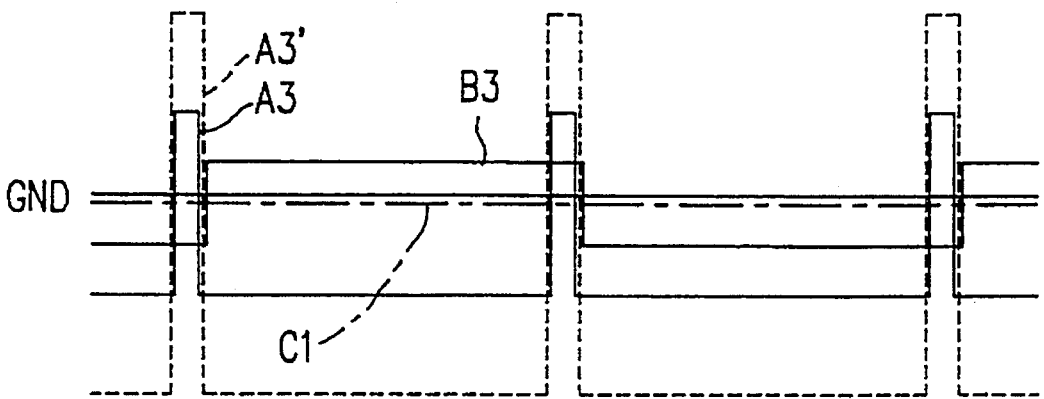

A signal generator 41 for gate lines generates a signal A3 for controlling the ON/OFF states of the gate bus lines 1, and supplies the signal A3 via an inspection/detection terminal 52 to the gate bus lines 1. A detection signal generator 40 generates a detection signal A3', as shown in FIGS. 18A, 18B and 18C, and supplies the signal A3' via an inspection/detection terminal 52 to the gate bus lines 1. A gate OFF voltage signal generator 42 generates a signal A4 (see FIG. 6) for controlling the OFF state of the gate bus lines 1, and supplies the signal A4 via the inspection/detection terminal 53 to the common line 10 for storage capacitance at the selection with a switch 48. The signal A3' is supplied via the inspection/detection terminal 51 to the spare line 13 by selectively controlling the ON/OFF states with the switch 46.

The above-described circuit, signals and the like are employed in the case of inspecting an active matrix substrate.

In the case of inspecting an active matrix liquid crystal panel, a signal generator 43 for counter electrodes generates a signal C1 having a voltage level fixed at that of the counter electrodes adjusted to be an optimal value so as to eliminate flickers, and supplies the signal C1 via an inspection/detection terminal 54 to the counter electrodes 5 by selectively controlling the ON/OFF states with a switch 49. A signal generator 44 for counter electrodes generates a signal (a similar signal to the signal C shown in FIG. 6; hereinafter this signal will be denoted by C2) having a variable voltage level ranging from a voltage for turning a TFT 3 ON to a voltage for turning the TFT 3 OFF, and then supplies the signal C2 via an inspection/detection terminal 54 to the counter electrodes 5 by selectively controlling the ON/OFF states with the switch 49.

The signal B1 output from the B1 signal generator 37, the signal B2 output from the B2 signal generator 38, and the signal B3 output from the B3 signal generator 39 are respectively output to the three terminals 45a, 45b and 45c of the switch 45. The switch 45 selects one of the three terminals 45a, 45b and 45c and then supplies the signal B1, B2 or B3 to the inspection/detection terminal 50. The inspection/detection terminal 50 is connected via the TAB 12a to the source bus lines 2.

The ON/OFF state controlling signal A3 output from the signal generator 41 for gate lines or the detection signal A3' output from the detection signal generator 40 is supplied to the inspection/detection terminal 52. The inspection/detection terminal 52 is connected via the TAB 11 to the gate bus lines 1. The OFF state controlling signal A4 output from the gate OFF voltage signal generator 42 is output to the terminal 48b, one of the three terminals 48a, 48b and 48c of the switch 48, while the signal C1 output from the signal generator 43 for counter electrodes and the signal C2 output from the signal generator 44 for counter electrodes are respectively output to the other two terminals 48a and 48c. The switch 48 selects one of the three terminals 48a, 48b and 48c and then supplies the signal A4, C1 or C2 to the inspection/detection terminal 53. The inspection/detection terminal 53 is connected via the TAB 11 to the terminal 10 for common storage capacitance.

The signal C1 and the signal C2 are respectively output to the three terminals 49a, 49b and 49c of the switch 49. The switch 49 selects one of the three terminals 49a, 49b and 49c and then supplies the signal C1 or C2 to the inspection/detection terminal 54. The inspection/detection terminal 54 is connected to the terminal C provided for the counter electrodes. The switches 45 to 49 are controlled by a controller (not shown), and the two switches 48 and 49 out of the four operate in conjunction with each other.

Next, a method for detecting and inspecting the defects of the active matrix substrate or the active matrix liquid crystal panel with the above-described defect detection apparatus will be described below.

In order to detect the defects, the active matrix substrate or the active matrix liquid crystal panel to be detected is first placed precisely in a predetermined position in the defect detection apparatus, and at the same time, the TABs 11, 12a and 12b are disposed along the outer periphery of the active matrix substrate or the active matrix liquid crystal panel so as to correspond to the positions of the terminals of the substrate or those of the terminals of the panel, and then the terminals of the active matrix substrate or the active matrix liquid crystal panel and the terminals of the TABs 11, 12a and 12b are made to come into contact with each other. For stabilizing this contact, a pressure may be applied thereto by using a spring, a clip or the like. The inspection TAB 11 is connected to the gate bus lines 1, and the inspection TABs 12a and 12b are connected to the respective terminals of the source bus lines 2, the spare lines 13 (and the terminal C of the counter electrodes in the case of inspecting the active matrix liquid crystal panel).

Thereafter, the switch 46 selects the terminal 46b and supplies the detection signal A3' output from the detection signal generator 40 to the spare lines 13; the switch 47 selects the terminal 47a and supplies the detection signal A3' output from the detection signal generator 40 to the common line for storage capacitance 10; and the switches 48 and 49 select the terminals 48a and 49a, respectively and supply the signal C1 output from the signal generator 43 for counter electrodes to the common line for storage capacitance 10. The switch 45 may be connected to any terminal. In this state, the respective signals are supplied during a predetermined period of time. In this example, a detection signal may have a voltage 1.5 to 3 times higher than a driving voltage commonly used for driving an active matrix liquid crystal panel, and the voltage is applied for one second. This applied voltage and the application time period may be set at such values as a normal TFT would not become damaged. As a result, the insulation properties already degraded at the crossings of the bus lines are further degraded, thereby generating a leakage current. This is why the detection is conducted with respect to the insulation properties of the crossings of the gate bus lines 1 and the source bus lines 2 of the active matrix liquid crystal panel, to the insulation properties of the crossings of the source bus lines 2 and the spare lines 13, and to the insulation properties of the crossings of the common line for storage capacitance 10 and the source bus line 2.

Next, in order to conduct a defect detection, the switch 46 selects the terminal 46c and supplies the signal C1 output from the signal generator 43 for counter electrodes to the spare lines 13; and the switch 47 selects the terminal 47b and cuts off the signal A3' output from the detection signal generator 40 from the common line for storage capacitance 10. The switch 45 may be connected to any terminal. In this state, the portions having inferior insulation properties at the crossings of the source bus lines 2 and the spare lines 13 are inspected. Subsequently, the switch 46 selects the terminal 46a, supplies the signals B1 to B3 output from the B1 to B3 signal generators 37 to 39 to the spare lines 13, and then selectively controls the ON/OFF states with the switches 48 and 49, thereby inspecting the respective point defects and line defects existing in the portions having inferior insulation properties at the crossings of the gate bus lines 1 and the source bus lines 2 and at the crossings of the common lines for storage capacitance 10 and the source bus lines 2.

After all of the above-mentioned detections and inspections are over, the supply of the signals to the respective portions is stopped, the connection to the TABs 11, 12a and 12b is cut, and then the active matrix substrate or the active matrix liquid crystal panel is removed from the defect detection apparatus. The active matrix substrate or the active matrix liquid crystal panel is screened based on the presence or the absence of the defects; that is to say, an unrepairable one is eliminated and a repairable one is repaired.

Hereinafter, the procedures to be conducted for the respective defective portions for detecting and inspecting the defects will be described.

(1) In the case where line defects occur between a gate bus line and a source bus line because of the generation of the leakage current, the detection and the inspection of the defects are conducted using the following procedure.

Figure 19A:
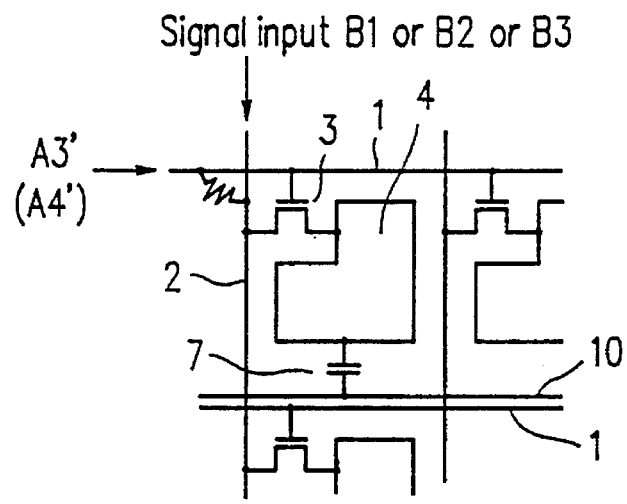
FIG. 19A is a view schematically showing a defective condition to be detected by the method according to the second example of the present invention in the case where a line defect is displayed because of a leakage current generated at a crossing of a gate bus line and a source bus line.

In this case, as shown in FIG. 19A, the signal A3' is applied to the gate bus line 1, so that the leakage current is generated in the portion having the degraded insulation properties between the gate bus line 1 and the source bus line 2. As a result, resulting display quality becomes inferior along the pixel electrodes arranged in a horizontal line and connected to the gate bus line 1 where the leakage current has been generated, and along the pixel electrodes arranged in a vertical line and connected to the source bus line 2 where the leakage current has been generated. Accordingly, these line defects are displayed in a cross shape.

In the case where such defects are generated, the amplitude between a gate voltage for turning the TFT 3 OFF and a gate voltage for turning the TFT 3 ON becomes smaller than the amplitude under a normal state being affected by the signal of the source bus line 2. As a result, neither the ON resistance of the TFT 3 nor the OFF resistance thereof may be maintained sufficiently and therefore the apparent behavior of the TFT 3 connected to the source bus line 2 and the gate bus line 1 where the leakage current is generated is similar to that of the TFT 3 having inferior OFF properties. In such a state, the defect inspection is conducted by applying a signal A3 and the signals B2 and B3 shown in FIGS. 20B and 20C. In this case, the horizontal line displayed as a line defect shown in FIG. 20C may be observed more visually and clearly than that shown in FIG. 20B, and at the same time, the vertical line displayed by the pixel electrodes connected to the source bus line 2 may also be observed clearly. As a result, the defective portions may be distinguished clearly based on the line defects in a cross shape which may be easily observed.

Figure 19B:
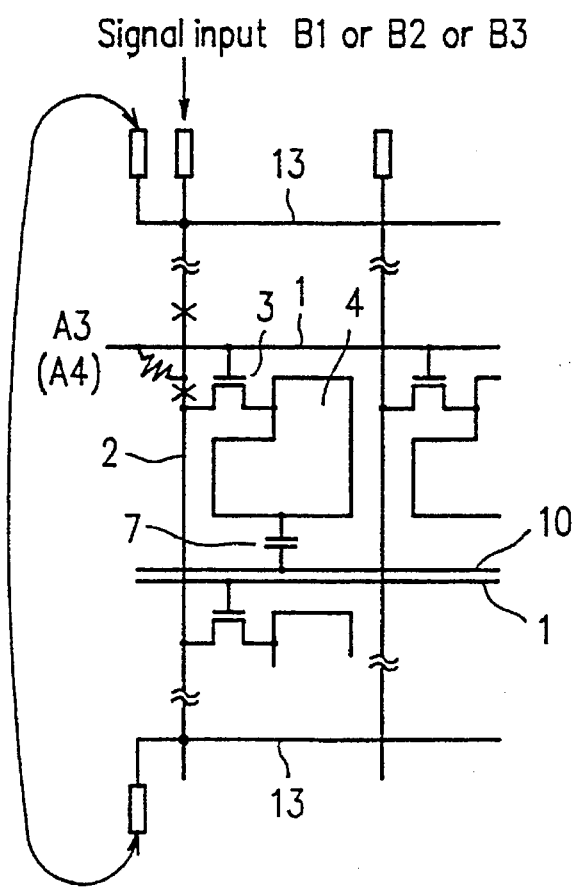
FIG. 19B is a view schematically showing a condition where the line defect shown in FIG. 19A is repaired.

In order to repair such a defect, as shown in FIG. 19B, both ends of the source bus line 2 where the leakage current is generated are cut off with a laser beam or the like; the crossing portion of the source bus line 2 and the spare line 13 are also connected to each other with a laser beam or the like; and a signal is applied to both sides of the source bus line 2.

Figure 20A:
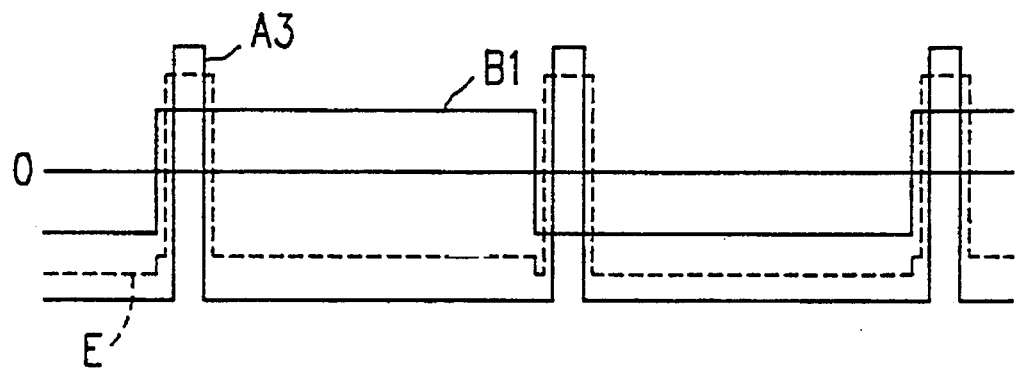
FIGS. 20A through 20C are views showing voltage levels and gate signal waveforms E respectively corresponding to the inspection signals B1, B2, and B3 in detecting a line defect displayed because of the leakage current generated at a crossing of a gate bus line and a source bus line.
Figure 20B:
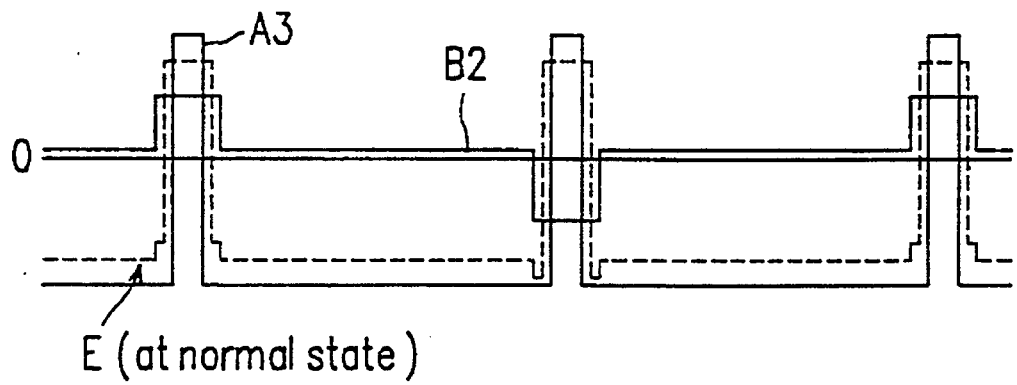
Figure 20C:
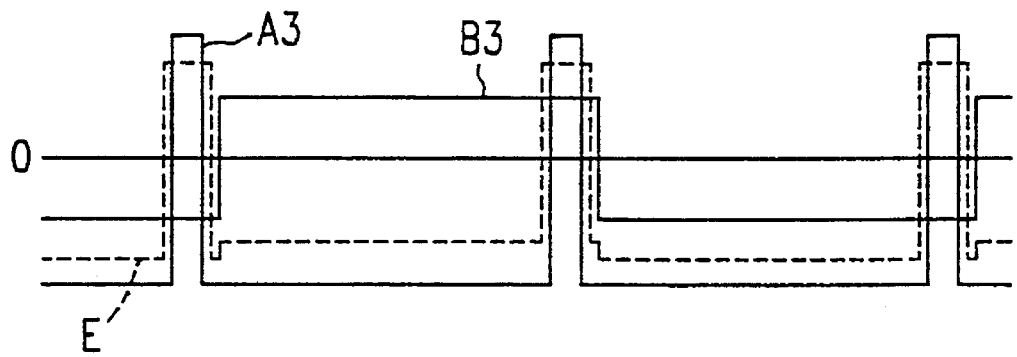

Since the respective potentials of the gate signal waveforms E in the case where the leakage current is generated between the gate bus line i and the source bus line 2 vary as shown in FIGS. 20A, 20B and 20C, the defects may be inspected by electrically measuring the potentials without conducting a visual observation.

(2) In the case where line defects occur between a spare line and a source bus line because of the generation of the leakage current, the detection and the inspection of the defects are conducted with the following procedure.

Figure 21A:
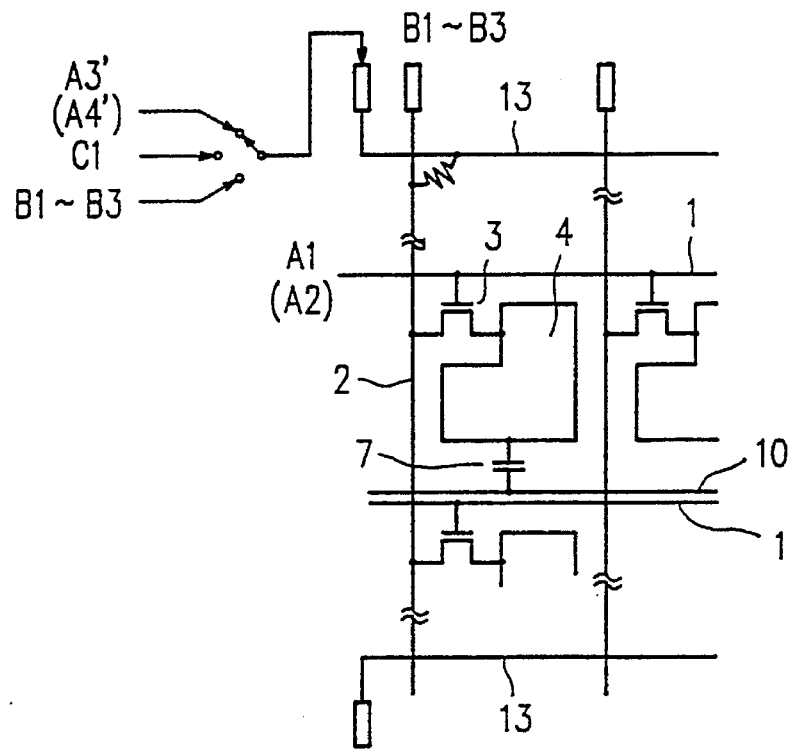
FIG. 21A is a view schematically showing a defective condition to be detected by the method according to the second example of the present invention in the case where a line defect is displayed because of a leakage current generated at a crossing of a spare line and a source bus line.

In this case, as shown in FIG. 21A, the signal A3' is applied to the spare line 13, so that the leakage current is generated in the portion having the degraded insulation properties between the spare line 13 and the source bus line 2, thereby causing this defect. In the case where such a defect is generated, the defect can not be inspected by applying the signals B1 to B3 to the spare line 13. If the signal C1 is supplied to the spare line 13, resulting display quality becomes inferior along the pixel electrodes arranged in a vertical line and connected to the source bus line 2 where the leakage current is generated.

In the case where such a defect is generated, the supply of the counter electrode signal C1 to the spare line 13 causes the amplitude of the source voltage to become smaller than that in a normal state, so that the voltage to be applied to the pixel electrodes 4 is reduced. As a result, no voltage can be applied to the pixel electrodes arranged in a vertical line and connected to the defective portions, thereby generating a bright line (in a Normally White mode). Therefore, these defects may be inspected by supplying the signals shown in FIGS. 22A, 22B and 22C.

Figure 21B:
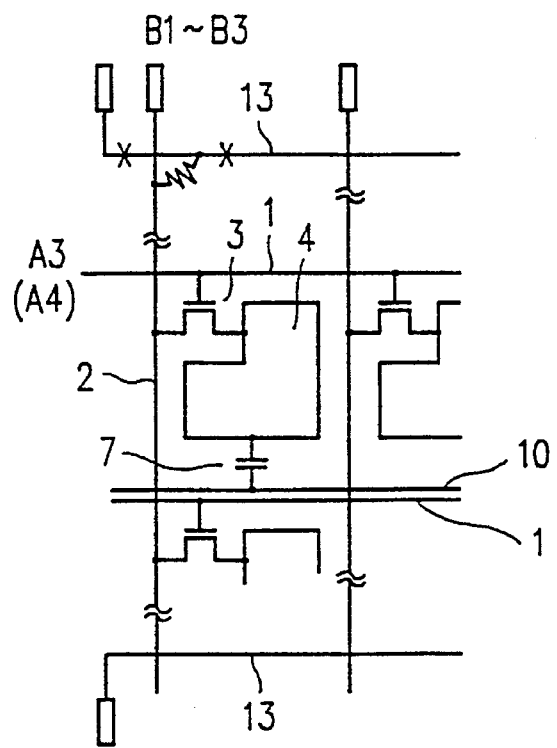
FIG. 21B is a view schematically showing a condition where the line defect shown in FIG. 21A is repaired.

In order to repair such a defect, as shown in FIG. 21B, both ends of the spare line 13 where the leakage current is generated are cut off with a laser beam or the like.

Figure 22A:
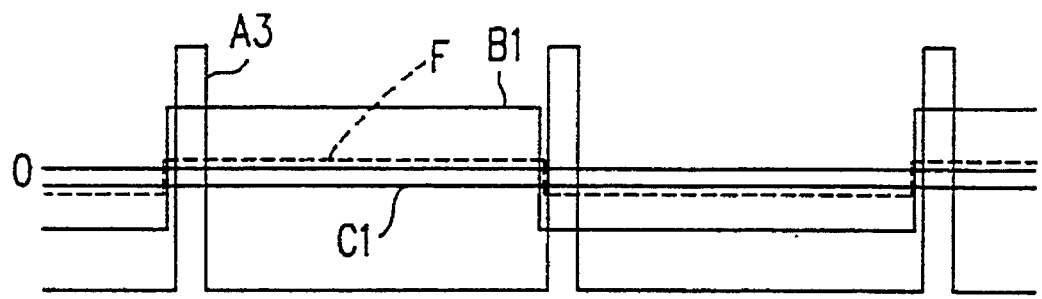
FIGS. 22A through 22C are views showing voltage levels and source signal waveforms F respectively corresponding to inspection signals B1, B2, and B3 in the case where a line defect displayed because of the leakage current generated at a crossing of a spare line and a source bus line is to be detected and a counter electrode signal C1 is supplied to the spare line.
Figure 22B:
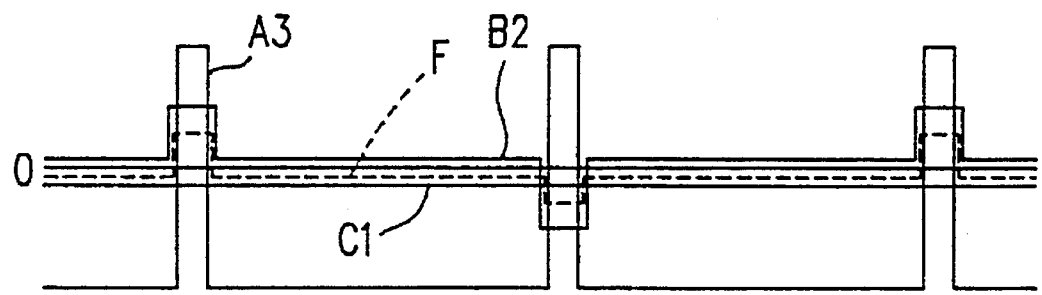
Figure 22C:
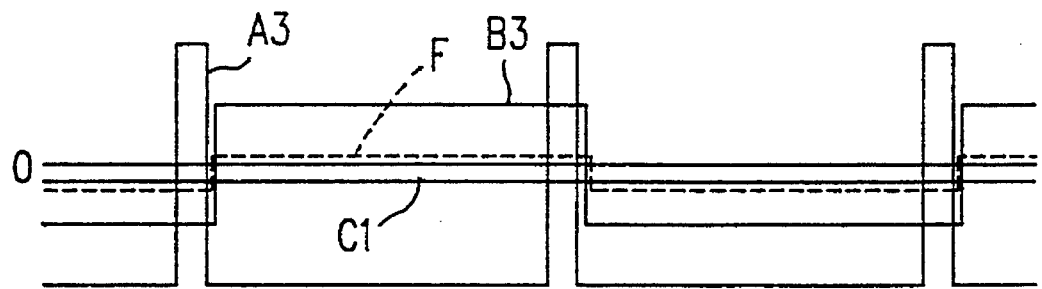

If the signal C1 is applied to the spare line 13, then the respective potentials of the source signal waveforms F in the case where the leakage current is generated between the spare line 13 and the source bus line 2 vary as shown in FIGS. 22A, 22B and 22C. Accordingly, the defects may be inspected by electrically measuring the potentials without conducting a visual observation.

(3) In the case where line defects occur between a common line for storage capacitance and a source bus line because of the generation of the leakage current, the detection and the inspection of the defects are conducted with the following procedure.

Figure 23A:
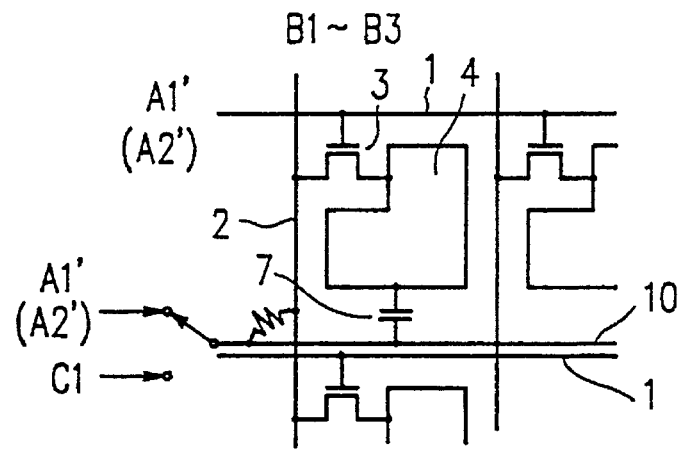
FIG. 23A is a view schematically showing a defective condition to be detected by the method according to the second example of the present invention in the case where a line defect is displayed because of a leakage current generated at a crossing of a common line for storage capacitance and a source bus line.

In this case, as shown in FIG. 23A, the signal A3' is applied to the common line for storage capacitance 10, so that the leakage current is generated in the portion having the degraded insulation properties between the common line for storage capacitance 10 and the source bus line 2, thereby causing this defect. The resulting display quality becomes inferior along the pixel electrodes arranged in vertical line and connected to the source bus line 2, so that a line defect is displayed. In addition, the resulting display quality becomes inferior also along the pixel electrodes arranged in a horizontal line and connected to the common line for storage capacitance 10, so that the line defects in a cross shape is displayed. In some cases, the linear defect is displayed from the halfway point of the source bus line 2. In order to inspect such a defect, the portion in the vicinity of the point where the linear defect disappears should be inspected along the source bus line 2.

In the case where such a defect is generated, the supply of the signal C1 of the common line for storage capacitance 10 causes the amplitude of the source voltage to become smaller than that under a normal state, so that the voltage to be applied to the pixel electrodes 4 is reduced. As a result, no voltage may be applied to the pixel electrodes arranged in a vertical line and connected to the defective portions, thereby generating a bright line (in a Normally White mode). Therefore, these defects may be detected by supplying the signals shown in FIGS. 24A, 24B and 24C.

Figure 23B:
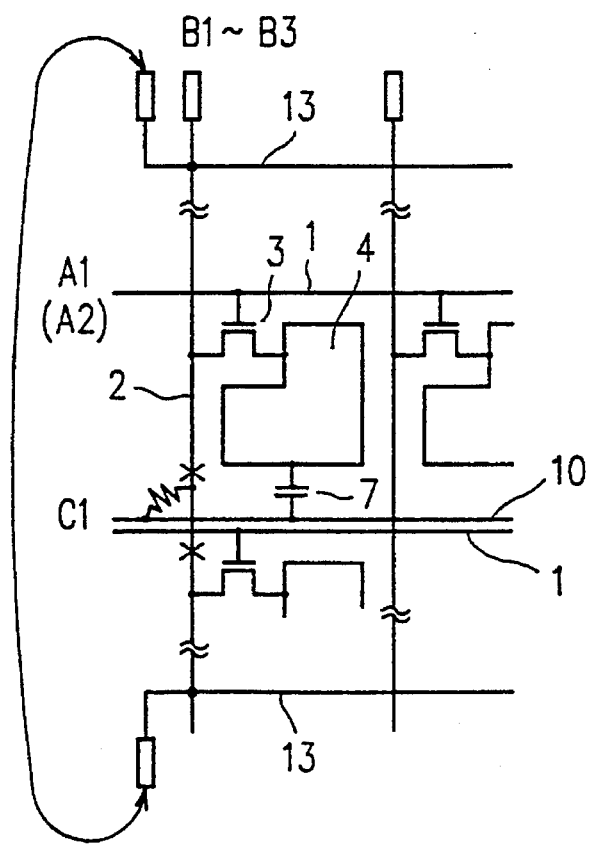
FIG. 23B is a view schematically showing a condition where the line defect shown in FIG. 23A is repaired.

In order to repair such a defect, as shown in FIG. 23B, both ends of the portion along the source bus line 2 at the crossing of the common line for storage capacitance 10 and the source bus line 2 where the leakage current is generated are cut off with a laser beam or the like. In addition, the crossing of the source bus line 2 and the spare line 13 is connected to each other with a laser beam or the like, and a signal is supplied to both sides of the source bus line 2.

Figure 24A:
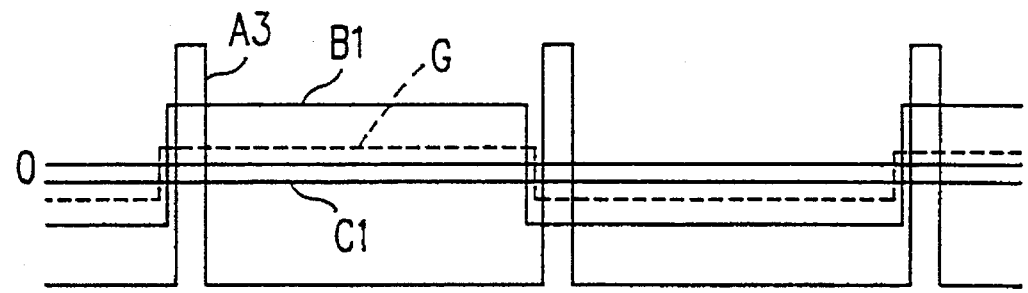
FIGS. 24A through 24C are views showing voltage levels and source signal waveforms G respectively corresponding to inspection-signals. B1, B2, and B3 in the case where a line defect displayed because of the leakage current generated in a portion between a common line for storage capacitance and a source bus line is to be detected and a counter electrode signal C1 is supplied to the common line for storage capacitance.
Figure 24B:
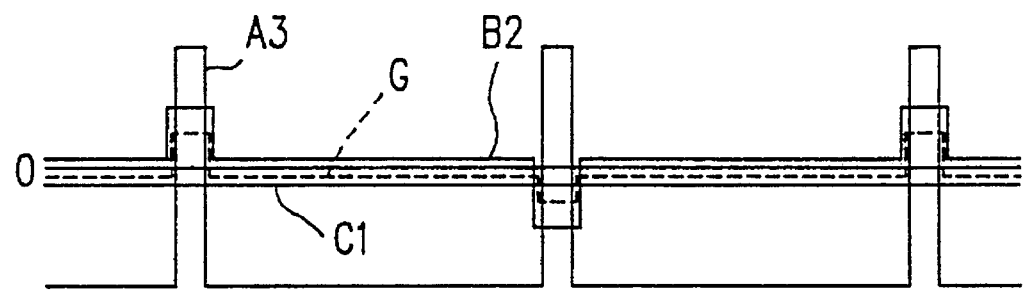
Figure 24C:
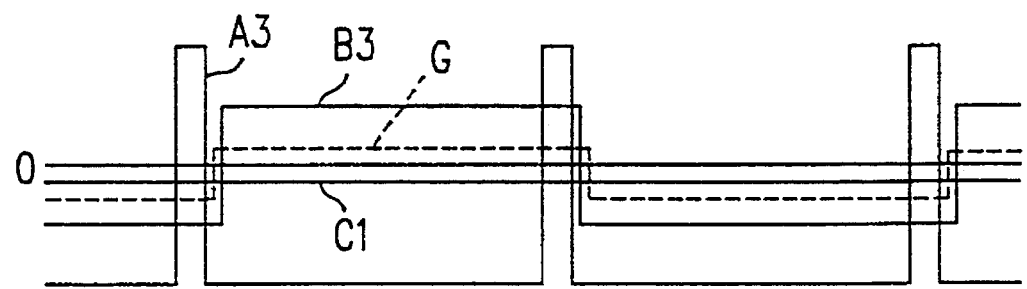

If the signal C1 is applied to the common line for storage capacitance 10, then the respective potentials of the source signal waveforms G in the case where the leakage current is generated between the common line for storage capacitance 10 and the source bus line 2 vary as shown in FIGS. 24A, 24B and 24C. Accordingly, the defects may be inspected by electrically measuring the potentials without conducting a visual observation.

As is apparent from the description of the above-mentioned Examples 1 and 2, a method and an apparatus for detecting the defects of an active matrix substrate or an active matrix liquid crystal panel present the following effects.

In an active matrix substrate or an active matrix liquid crystal panel, if some portions having degraded insulation properties exist at the insulated portions between the crossed electrodes because of the presence of pin holes or a residual film, then the portions having degraded insulation properties may become defective owing to stress during long-term use. According to a conventional inspection method, such portions having degraded insulation properties which may become defects in the future can not be inspected. According to a method and an apparatus of the present invention for detecting the defects, a voltage higher than a voltage commonly used for driving a display apparatus is applied to the crossing of crossed bus lines such as a gate bus line and a source bus line, a spare line and a source bus line, and a common line for storage capacitance and a source bus line, so that a leakage current is generated in such portions having degraded insulation properties. As a result, such portions may be detected beforehand as defects. The defects may be inspected in accordance with various methods, e.g. a visual observation, an optical method, and the like.

According to a repairing method of the present invention, the portions where some defects may be generated in the future may be repaired beforehand; the production yield may be improved; and an inferior product which may become defective in the future may be eliminated, so that the reliability of the repairing method may be improved.

Conventionally, the presence of a leakage current generated between a spare line and a source bus line of an active matrix substrate can not be identified before a driving circuit is mounted on a substrate. According to a defect detection method of the present invention, the leakage current generated between a spare line and a source bus line may be conveniently distinguished as a line defect by applying the same signal to the spare line and the counter electrode during an actual operation test. As a result, according to a repairing method of the present invention, the defects may be repaired before mounting a driving circuit onto a substrate, so that the production yield may be improved during a mounting step. In addition, the method of this invention saves the processing of an inferior product during a posterior step, thereby reducing the cost and improving the productivity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A defect detection method for at least one of an active matrix substrate and an active matrix liquid crystal panel, the active matrix substrate comprising: an insulating substrate; a plurality of pixel electrodes arranged in a matrix fashion on the substrate; switching elements for driving the plurality of pixel electrodes; and scanning lines and signal lines which are respectively connected to the switching elements and are formed so as to cross each other, the active matrix liquid crystal panel comprising: the active matrix substrate; a counter substrate provided with counter electrodes thereon and disposed so as to oppose the active matrix substrate; and a liquid crystal layer interposed between the active matrix substrate and the counter substrate, the method comprising the steps of:

applying one of a first signal and second signal to the scanning lines; and applying a third signal to the signal lines, the first signal, the second signal and the third signal having waveforms different from one another, the first signal having a first voltage turning the switching elements on and a second voltage turning the switching elements off, the second signal having at least a third voltage higher than the first voltage, and turning on the switching elements.

2. A defect detection method according to claim 1, wherein a storage capacitance formed in conjunction with the pixel electrodes is connected to a scanning line adjacent to another scanning line connected to the pixel electrodes with the pixel electrodes interposed therebetween.

3. A defect detection method according to claim 2, wherein the storage capacitance, formed in conjunction with the pixel electrodes, is connected to a common line.

4. A defect detection method according to claim 1, wherein the active matrix substrate further comprises spare lines insulated from the signal lines and formed so as to cross each other, and wherein the method further comprises a step of applying, to the spare lines, one of the second signal and a fourth signal which is applied to the counter electrodes, the second signal being applied to the spare lines when the first signal is applied to the scanning lines, and the fourth signal being applied to the spare lines when the first signal is applied to the scanning lines.

5. A defect detection method according to claim 4, further comprising a step of applying the third signal to the spare lines while the third signal is applied to the signal lines.

6. A defect detection method according to claim 1, wherein the third voltage of the second signal is equal to 1.5 to 3 times the first voltage of the first signal.

7. A defect detection apparatus for at least one of an active matrix substrate and an active matrix liquid crystal panel, the active matrix substrate comprising:

an insulating substrate;

a plurality of pixel electrodes arranged in a matrix fashion on the substrate;

switching elements for driving the plurality of pixel electrodes; and scanning lines and signal lines which are respectively connected to the switching elements and are formed so as to cross each other, the active matrix liquid crystal panel comprising:

the active matrix substrate;

a counter substrate provided with counter electrodes thereon and disposed so as to oppose the active matrix substrate; and a liquid crystal layer interposed between the active matrix substrate and the counter substrate, the defect detection apparatus comprising:

connection terminals to be connected respectively to the scanning lines, the signal lines and the counter electrodes;

a detection signal application means for applying one of a first signal and a second signal to the scanning lines and for applying a third signal to the signal lines, the first signal, the second signal and the third signal having different waveforms from one another; and a detection means for detecting the defects of the active matrix substrate via the connection terminals, wherein the first signal has a first voltage turning the switching elements on and a second voltage turning the switching elements off, the second signal has at least a third voltage higher than the first voltage, and wherein the second signal turns on the switching elements.

8. A defect detection apparatus according to claim 7, wherein a storage capacitance formed in conjunction with the pixel electrodes is connected to a scanning line adjacent to another scanning line connected to the pixel electrodes with the pixel electrodes interposed therebetween.

9. A defect detection apparatus according to claim 8, wherein the storage capacitance formed in conjunction with the pixel electrodes is connected to a common line.

10. A defect detection apparatus according to claim 7, wherein the active matrix substrate comprises spare lines insulated with the signal lines and formed so as to be crossed with each other, and wherein the detection signal application means applies, to the spare lines, one of the second signal and a fourth signal which is applied to the counter electrodes, and the detection means detects a first type of defect when the second signal is applied to the spare lines and the scanning lines, and a second type of defect when the fourth signal is applied to the spare lines and the counter electrodes.

11. A defect detection apparatus according to claim 10, wherein the detection signal application means applies the third signal to the spare lines while the third signal is applied to the signal lines.

12. A defect detection apparatus according to claim 7, wherein the third voltage of the second signal is equal to 1.5 to 3 times the first voltage of the first signal.

13. A defect repairing method for at least one of an active matrix substrate and an active matrix liquid crystal panel, the active matrix substrate comprising: an insulating substrate; a plurality of pixel electrodes arranged in a matrix fashion on the substrate; switching elements for driving the plurality of pixel electrodes; and scanning lines and signal lines which are respectively connected to the switching elements and are formed so as to be crossed with each other, the active matrix liquid crystal panel comprising: the active matrix substrate; a counter substrate provided with counter electrodes thereon and disposed so as to be opposed to the active matrix substrate; and a liquid crystal layer interposed between the active matrix substrate and the counter substrate, the method comprising the steps of:

detecting the defects, the detecting step including steps of applying one of a first signal and a second signal to the scanning lines and applying a third signal to the signal lines, the first signal, the second signal and the third signal having different waveforms from one another, the first signal having a first voltage turning the switching elements on and a second voltage turning the switching elements off, the second signal having at least a third voltage higher than the first voltage, turning on the switching elements; and repairing each defect in accordance with its respective kind of defect.

14. A defect repairing method according to claim 13, wherein a storage capacitance formed in conjunction with the pixel electrodes is connected to a scanning line adjacent to another scanning line connected to the pixel electrodes with the pixel electrodes interposed therebetween.

15. A defect repairing method according to claim 14, wherein the storage capacitance, formed in conjunction with the pixel electrodes, is connected to a common line.

16. A defect repairing method according to claim 13, wherein the active matrix substrate comprises spare lines insulated from the signal lines and formed so as to cross each other, and wherein the detecting step further includes a step of applying, to the spare lines, one of the second signal and a fourth signal which is applied to counter electrodes, the second signal being applied to the spare lines when the first signal is applied to the scanning lines, and the fourth signal being applied to the spare lines when the first signal is applied to the scanning lines.

17. A defect repairing method according to claim 16, wherein the detecting step further includes a step of applying the third signal to the spare lines when the third signal is applied to the signal lines.

18. A defect repairing method according to claim 13, wherein the third voltage of the second signal is equal to 1.5 to 3 times the first voltage of the first signal.

* * * * *

UNITED STATES PATENT AND TRADEMARK OFFICE
CERTIFICATE OF CORRECTION

PATENT NO. : 5,608,558

DATED : MARCH 4, 1997

INVENTOR(S) : K. IRIE

It is certified that error appears in the above-indentified patent and that said Letters Patent is hereby corrected as shown below:

<u>ON THE TITLE PAGE</u>:

Item [75]; Inventor's name, replace "KATSUMI" with --IRIE--.

Signed and Sealed this

Tenth Day of June, 1997

Attest:

Attesting Officer

BRUCE LEHMAN

Commissioner of Patents and Trademarks